United States Patent
Choi et al.

(10) Patent No.: US 10,678,420 B2
(45) Date of Patent: Jun. 9, 2020

(54) ELECTRONIC DEVICE AND UI PROVIDING METHOD THEREFOR

(71) Applicant: Samsung Electronics Co., Ltd., Gyeonggi-do (KR)

(72) Inventors: Yu-ri Choi, Seoul (KR); Hee-sung Park, Seoul (KR); Se-rin Ko, Gyeonggi-do (KR); Dong-seok Kim, Gyeonggi-do (KR); Jeong-pyo Lee, Gyeonggi-do (KR); Seung-hyun Cho, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/763,330

(22) PCT Filed: Sep. 21, 2016

(86) PCT No.: PCT/KR2016/010495
§ 371 (c)(1),
(2) Date: Mar. 26, 2018

(87) PCT Pub. No.: WO2017/052168
PCT Pub. Date: Mar. 30, 2017

(65) Prior Publication Data
US 2018/0292962 A1   Oct. 11, 2018

(30) Foreign Application Priority Data

Sep. 25, 2015   (KR) .................... 10-2015-0136989

(51) Int. Cl.
*G06F 17/00*   (2019.01)
*G06F 3/048*   (2013.01)
(Continued)

(52) U.S. Cl.
CPC ......... *G06F 3/0486* (2013.01); *G05B 19/409* (2013.01); *G06F 3/048* (2013.01);
(Continued)

(58) Field of Classification Search
CPC ............................. G06F 3/0486; H04L 67/12
(Continued)

(56) References Cited

U.S. PATENT DOCUMENTS 9,335,816 B2   5/2016   Feng et al.
2013/0139089 A1   5/2013   Cho et al.
(Continued)

FOREIGN PATENT DOCUMENTS

JP   2015508523   3/2015
KR   1020120072518   7/2012
(Continued)

OTHER PUBLICATIONS

Nhu-Ngoc Dao et al., Pattern-Identified Online Task Scheduling in Multitier Edge Computing for Industrial IoT Services, Published Apr. 2018, doi.org, pp. 1-9 (pdf).*
(Continued)

*Primary Examiner* — Manglesh M Patel
(74) *Attorney, Agent, or Firm* — The Farrell Law Firm, P.C.

(57) ABSTRACT

Disclosed is an electronic device. The present electronic device comprises a display, and a processor configured to display, through the display, a UI based on use patterns of a plurality of devices connected to a same network, wherein the UI comprises a device axis and a time axis, and provides information related to use of at least one device in a region where the device axis and the time axis intersect each other.

16 Claims, 17 Drawing Sheets

(51) Int. Cl.
  *G06F 3/0486* (2013.01)
  *G06F 3/0484* (2013.01)
  *G06F 3/0488* (2013.01)
  *H04M 1/725* (2006.01)
  *G05B 19/409* (2006.01)
  *H04L 12/28* (2006.01)

(52) U.S. Cl.
  CPC ........ *G06F 3/0488* (2013.01); *G06F 3/04842* (2013.01); *G06F 3/04847* (2013.01); *H04M 1/725* (2013.01); *H04L 12/2803* (2013.01)

(58) Field of Classification Search
  USPC .......................................... 715/200, 769, 963
  See application file for complete search history.

(56) References Cited

U.S. PATENT DOCUMENTS

| 2014/0167929 | A1 | 6/2014 | Shim et al. |
| 2015/0019714 | A1* | 1/2015 | Shaashua ............... H04W 4/70 709/224 |
| 2015/0066158 | A1 | 3/2015 | Kim et al. |
| 2015/0140990 | A1 | 5/2015 | Kim et al. |
| 2016/0139752 | A1 | 5/2016 | Shim et al. |

FOREIGN PATENT DOCUMENTS

| KR | 1020130060109 | 6/2013 |
| KR | 1020140076954 | 6/2014 |
| KR | 1020140077127 | 6/2014 |
| KR | 1020140118925 | 10/2014 |
| KR | 1020140147059 | 12/2014 |
| KR | 1020150032151 | 3/2015 |
| KR | 1020150059081 | 5/2015 |
| WO | WO 2015/076609 | 5/2015 |

OTHER PUBLICATIONS

Park et al., Two-Stage IoT Device Scheduling with Dynamic Programming for Energy Internet Systems, Published 2019 by IEEE, pp. 1-10 (pdf).*
Kim et al., Adaptive Packet Scheduling in IoT Environment Based on Q-learning, Published 2018 vis Elsevier Ltd., pp. 1-8 (pdf).*
European Search Report dated Sep. 10, 2018 issued in counterpart application No. 16848894.8-1221, 14 pages.
PCT/ISA/237 Written Opinion issued on PCT/KR2016/010495 (pp. 14).
PCT/ISA/210 Search Report issued on PCT/KR2016/010495 (pp. 2).
Tsai, Chun-Wei et al., Data Mining for Internet of Things: A Survey, IEEE Communications Surveys & Tutorials, vol. 16 No. 1, First Quarter 2014, Copyright 2014 IEEE, pp. 77-97.
European Search Report dated Apr. 9, 2019 issued in counterpart application No. 16848894.8-1221, 6 pages.

* cited by examiner

ELECTRONIC DEVICE AND UI PROVIDING METHOD THEREFOR

PRIORITY

This application is a National Phase Entry of International Application No. PCT/KR2016/010495, which was filed on Sep. 21, 2016, and claims priority to Korean Patent Application No. 10-2015-0136989, which was filed on Sep. 25, 2015, the content of each of which is incorporated herein by reference.

TECHNICAL FIELD

The present disclosure relates to an electronic device and a user interface (UI) providing method therefor, and more particularly, to an electronic device which provides use patterns of other devices and a UI providing method therefor.

BACKGROUND ART

Thanks to the development of electronic technology, various types of devices are developing and are being distributed, and devices provided with various communication functions are increasingly used in normal households. Furthermore, related-art devices without communication functions are provided with communication functions, thereby establishing an IoT environment.

The IoT is the abbreviation of Intent of Things and refers to an environment where things in life are connected with one another via a wired or wireless network, and share information with one another. In various fields such as smart home, etc., information may be shared by connecting things. In addition, users are able to control various devices remotely using communication functions.

However, as various devices provided with communication functions are distributed, the number of devices connected to a network increases, and thus there is an inconvenience in controlling the plurality of devices individually.

Therefore, there is a demand for a method for monitoring and controlling IoT devices more intuitively.

DETAILED DESCRIPTION OF THE PRESENT DISCLOSURE

Technical Objects

The present disclosure has been developed in order to meet the above-mentioned demand, and an object of the present disclosure is to provide an electronic device which controls a plurality of devices by providing a UI related to use patterns of the plurality of devices connected to the same network, and a UI providing method therefor.

Technical Solving Method

According to an exemplary embodiment of the present disclosure to achieve the above-described object, an electronic device includes: a display; and a processor configured to display, through the display, a UI based on use patterns of a plurality of devices connected to a same network, wherein the UI includes a device axis and a time axis, and provides information related to use of at least one device in a region where the device axis and the time axis intersect each other.

In addition, the information related to the use of the at least one device may include at least one of information indicating whether an operation state of the at least one device is changed, and detailed information regarding an operation state of the at least one device.

In addition, the processor may be configured to group a plurality of devices belonging to a first time section of the time axis on the UI, based on operation states of the plurality of devices, and to provide the group, and, in response to the first time section coming, the processor may be configured to control the grouped plurality of devices simultaneously.

In addition, the processor may be configured to display a GUI for visually feeding back information indicating that the grouped plurality of devices are grouped, and, in response to a user interaction of dragging the GUI and dropping the GUI into a second time section being inputted, the processor may be configured to control the grouped plurality of devices to operate in the same operation states in the second time section as the operation states in the first time section.

In addition, the device axis may be divided into identification information of the plurality of devices and environment information related to functions of the plurality of devices, and the processor may be configured to provide detailed environment information corresponding to the environment information in a region where the environment information of the device axis and the time axis intersect each other.

In addition, the processor may be configured to group a plurality of devices and the detailed environment information belonging to a third time section of the time axis on the UI, based on the operation states of the plurality of devices, and to provide the group, and, in response to the third time section in which an ambient environment is the same as the detailed environment coming, the processor may be configured to control the grouped plurality of devices to operate in the same operation states as the operation states in the third time section.

In addition, the environment information may include at least one of weather, indoor temperature, outdoor temperature, humidity, and illuminance.

In response to a pinch-in interaction being inputted on any one of the regions where the device axis and the time axis intersect each other, the processor may be configured to display a guide message according to detailed information on a device corresponding to the device axis and environment information included in the time axis.

In addition, in response to a pinch-in interaction being inputted in the device axis direction, the processor may be configured to group the plurality of devices according to types of the devices, and to categorize the grouped group according to a type and to display the group, and, in response to a pinch-out interaction being inputted in the device axis direction, the processor may be configured to display detailed information of the plurality of devices.

In addition, in response to a pinch-in or pinch-out interaction being inputted in the time axis direction, the processor may be configured to change a time unit of the time axis, and to change the information related to the use of the at least one device displayed to information corresponding to the changed time unit.

According to an exemplary embodiment of the present disclosure to achieve the above-described object, a method for providing a UI of an electronic device, the method includes: generating a UI based on use patterns of a plurality of devices connected to a same network, wherein the UI includes a device axis and a time axis, and provides information related to use of at least one device in a region where the device axis and the time axis intersect each other; and displaying the generated UI.

In addition, the information related to the use of the at least one device may include at least one of information indicating whether an operation state of the at least one device is changed, and detailed information regarding an operation state of the at least one device.

The method may further include: grouping a plurality of devices belonging to a first time section of the time axis on the UI, based on operation states of the plurality of devices, and providing the group; and, in response to the first time section coming, controlling the grouped plurality of devices simultaneously.

The grouping and providing may further include displaying a GUI for visually feeding back information indicating that the grouped plurality of devices are grouped, and, in response to a user interaction of dragging the GUI and dropping the GUI into a second time section being inputted, controlling the grouped plurality of devices to operate in the same operation states in the second time section as the operation states in the first time section.

In addition, the device axis may be divided into identification information of the plurality of devices and environment information related to functions of the plurality of devices, and the method may further include providing detailed environment information corresponding to the environment information in a region where the environment information of the device axis and the time axis intersect each other.

In addition, the method may further include: grouping a plurality of devices and the detailed environment information belonging to a third time section of the time axis on the UI, based on the operation states of the plurality of devices, and providing the group; and, in response to the third time section in which an ambient environment is the same as the detailed environment coming, controlling the grouped plurality of devices to operate in the same operation states as the operation states in the third time section.

In addition, the environment information may include at least one of weather, indoor temperature, outdoor temperature, humidity, and illuminance.

In addition, the method may further include, in response to a pinch-in interaction being inputted on any one of the regions where the device axis and the time axis intersect each other, displaying a guide message according to detailed information on a device corresponding to the device axis and environment information included in the time axis.

In addition, in response to a pinch-in interaction being inputted in the device axis direction, the displaying may group the plurality of devices according to types of the devices, and categorize the grouped group according to a type and display the group, and, in response to a pinch-out interaction being inputted in the device axis direction, the displaying may display detailed information of the plurality of devices.

In addition, the displaying may include: in response to a pinch-in or pinch-out interaction being inputted in the time axis direction, changing a time unit of the time axis; and changing the information related to the use of the at least one device displayed to information corresponding to the changed time unit.

Advantageous Effect

According to various embodiments of the present disclosure as described above, a UI regarding use patterns of a plurality of devices connected to the same network may be provided, and the plurality of devices may be controlled through the UI, such that user's convenience can be enhanced.

DETAILED DESCRIPTION

Figure 1:
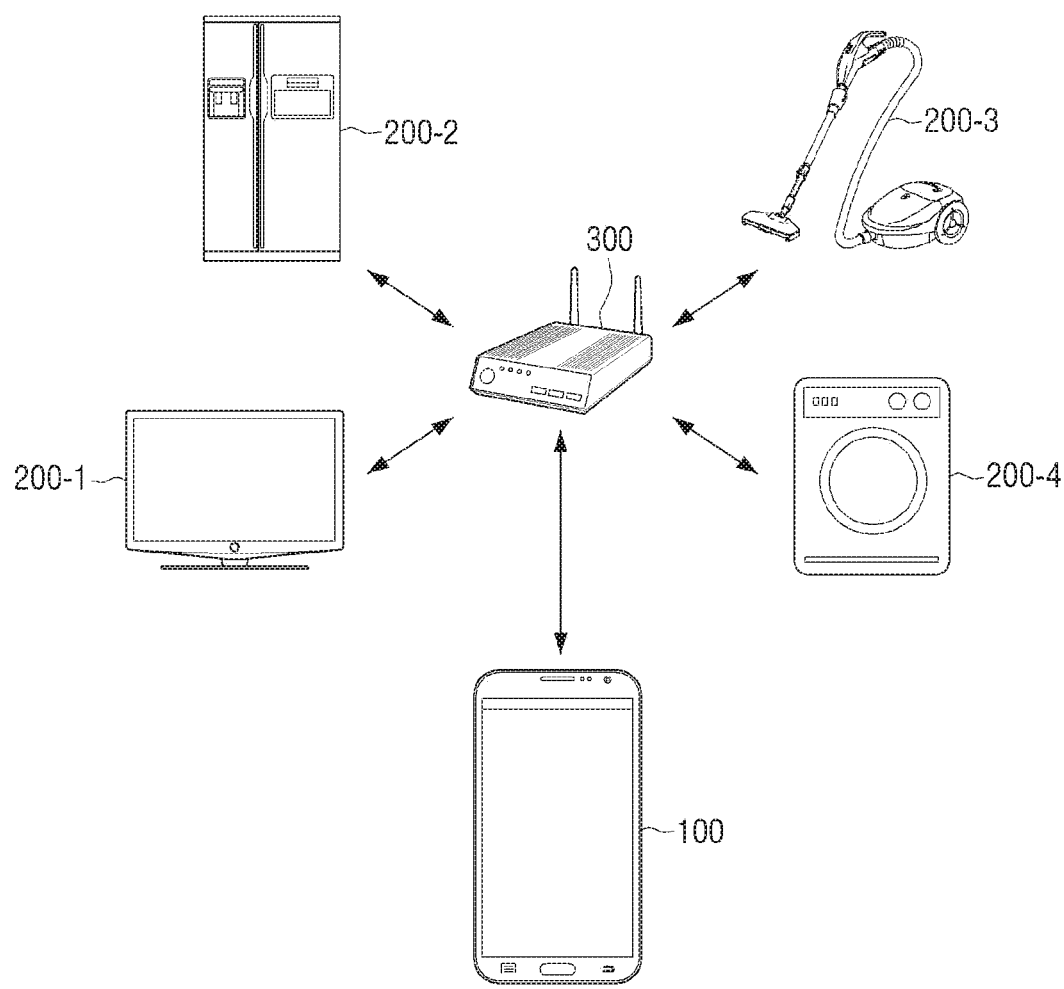
FIG. 1 is a view showing an IoT system according to an exemplary embodiment of the present disclosure.

Exemplary embodiments of the present disclosure will be described herein below with reference to the accompanying drawings. However, various exemplary embodiments of the present disclosure are not limited to the specific embodiments and should be construed as including modifications, equivalents and/or alternatives of exemplary embodiments of the present disclosure. In the explanation of the drawings, same or similar reference numerals are used for similar elements.

The term such as "first" and "second" used in the present disclosure may be used to distinguish various elements regardless of an order and/or importance of the elements.

Accordingly, the order or importance of the corresponding elements are not limited by these expressions. For example, a first element may be named a second element without departing from the scope of right of the present disclosure, and similarly, a second element may be named a first element.

It will be understood that when an element (for example, a first element) is "(operatively or communicatively) coupled with/to" or "connected with" another element (for example, a second element), the element may be directly coupled with/to another element, and there may be an intervening element (for example, a third element) between the element and another element. To the contrary, it will be understood that when an element (for example, a first element) is "directly coupled with/to" or "directly connected to" another element (for example, a second element), there is no intervening element (for example, a third element) between the element and another element.

The terms used in the present disclosure are just for the purpose of describing particular exemplary embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same meanings as the contextual meanings of the relevant technology and should not be interpreted as having ideal or exaggerated meanings unless they are clearly defined in the various exemplary embodiments. According to circumstances, even the terms defined in the exemplary embodiments should not be interpreted as excluding the embodiments of the present disclosure.

Hereinafter, various embodiments of the present disclosure will be described in detail with reference to the accompanying drawings.

FIG. 1 is a view showing an IoT system 10 according to an exemplary embodiment of the present disclosure. Referring to FIG. 1, the IoT system 10 includes an electronic device 100, a plurality of devices 200-1, 200-2, 200-3, 200-4, and a network device 300.

The IoT system 10 may be implemented by using a home network system, which connects all electric and electronic devices in a household to one another in a wired or wireless manner, thereby enabling bidirectional communication thereamong, but any system that connects the plurality of devices 200-1, 200-2, 200-3, 200-4 to one another via a network and controls the same is applicable without being limited thereto. For example, the IoT system 10 may include a system that connects devices in an office to one another via a network and controls the same.

As shown in the drawing, the electronic device 100 may be implemented by using a mobile phone such as a smart phone, but is not limited thereto. The electronic device 100 may be implemented by using various types of devices which are portable and are provided with a display function, such as a tablet personal computer (PC), a portable multimedia player (PMP), a personal digital assistant (PDA), a navigation device, or the like. In addition, the electronic device 100 may have a touch screen embedded therein and may be implemented to execute an application by using a finger or a pen (for example, a stylus pen).

The electronic device 100 may access the network device 300 and receive use patterns of the plurality of devices 200-1, 200-2, 200-3, 200-4. For example, the electronic device 100 may receive, from the network device 300, information indicating that the smart TV is turned on from 6 p.m. to 10 p.m. on weekdays.

The electronic device 100 may display the use patterns of the plurality of devices 200-1, 200-2, 200-3, 200-4, received from the network device 300. For example, the electronic device 100 may display information regarding the plurality of devices 200-1, 200-2, 200-3, 200-4 which have been used for a week by using a table or a graph.

The electronic device 100 may transmit a control command to control the plurality of devices 200-1, 200-2, 200-3, 200-4 to the network device 300. For example, in response to a user command to turn on the smart TV being inputted, the electronic device 100 may transmit a corresponding control command to the network device 300 and control the smart TV to be turned on.

The plurality of devices 200-1, 200-2, 200-3, 200-4 may be electronic devices that are connected to a network. For example, the plurality of devices 200-1, 200-2, 200-3, 200-4 may be a smart TV, a refrigerator, a cleaner, a washing machine, a lamp, a thermostat, a computer, an oven, a digital picture frame, or the like. However, this should not be considered as limiting, and the plurality of devices 200-1, 200-2, 200-3, 200-4 are not limited to special devices as long as they are provided with a communication function.

In response to an operation state being changed, the plurality of devices 200-1, 200-2, 200-3, 200-4 may transmit corresponding information to the network device 300. For example, in response to the smart TV being turned on, the smart TV may transmit a time at which the smart TV is turned on, information on a viewed channel, etc. to the network device 300.

The plurality of devices 200-1, 200-2, 200-3, 200-4 may receive a control command from the network device 300 and may perform a corresponding operation. For example, in response to a control command to turn on the smart TV being received, the smart TV may be turned on and transmit a time at which the smart TV is turned on, information on a viewed channel, etc. to the network device 300.

The network device 300 may be implemented by using a gateway device, a network server, an external cloud server, or the like, and may control overall operations of the plurality of devices 200-1, 200-2, 200-3, 200-4 in the IoT system 10. That is, the network device 300 may control the operations of the plurality of devices 200-1, 200-2, 200-3, 200-4 which are communicable therewith. For example, the network device 300 may be implemented by using a home server, a network server, or the like.

The network device 300 may receive information on the use patterns of the plurality of devices 200-1, 200-2, 200-3, 200-4, and may transmit the information to the electronic device 100. For example, the network device 300 may transmit, to the electronic device 100, a time at which the smart TV is turned on, information on a viewed channel, information on a time at which the refrigerator is opened, information on a time at which the cleaner is used, etc.

The network device 300 may transmit a control command to control the plurality of devices 200-1, 200-2, 200-3, 200-4, based on a control command received from the electronic device 100. Alternatively, the network device 300 may convert the received control command and may transmit the control command to the plurality of devices 200-1, 200-2, 200-3, 200-4. For example, when the IoT system 10 is established as shown in FIG. 1, the network device 300 may store control commands to control various functions that are provided by the smart TV, the refrigerator, the cleaner, and the washing machine, and may convert the control command received from the electronic device 100 into a control command corresponding to each of the devices, and may transmit the control command.

In the above-described example, the electronic device 100 and the plurality of devices 200-1, 200-2, 200-3, 200-4 communicate with one another by using the network device 300. However, this should not be considered as limiting. For example, after the electronic device 100 and the plurality of devices 200-1, 200-2, 200-3, 200-4 are initially connected to one another by using the network device 300, the electronic device 100 and the plurality of devices 200-1, 200-2, 200-3, 200-4 may directly communicate with one another without the network device 300. Alternatively, the electronic device 100 and the plurality of devices 200-1, 200-2, 200-3, 200-4 may be configured to directly communicate with one another from the outset. Alternatively, the electronic device 100 may be configured to communicate with the plurality of devices 200-1, 200-2, 200-3, 200-4 by using an external server that communicates with the network device 300. In this case, the electronic device 100 may receive the use patterns of the plurality of devices 200-1, 200-2, 200-3, 200-4 by communicating with the external server through the Internet or the like, and may transmit a control command.

Figure 2A:
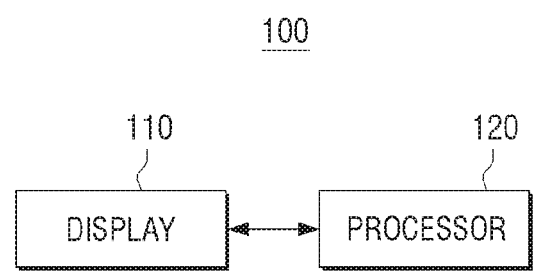
FIGS. 2A and 2B are block diagrams to illustrate an example of a configuration of an electronic device.

FIG. 2A is a block diagram showing a configuration of the electronic device 100 according to an exemplary embodiment of the present disclosure.

Referring to FIG. 2A, the electronic device 100 includes a display 110 and a processor 120.

The display 110 may display information on the use patterns of the plurality of devices under the control of the processor 120. In addition, the display 110 may display a graphic user interface (GUI) indicating that the plurality of devices are grouped. In addition, the display 110 may display a UI to receive a user interaction.

In addition, the display 110 may be implemented by using a liquid crystal display (LCD) panel, an organic light emitting diode (OLED), etc., but is not limited thereto. In addition, the display 110 may be implemented by using a flexible display, a transparent display, etc. according to a circumstance.

The processor 120 controls the overall operation of the electronic device 100.

In particular, the processor 120 may display, through the display 110, a UI which includes a device axis and a time axis and provides information related to the user of at least one device in a region where the device axis and the time axis intersect each other, based on the use patterns of the plurality of devices connected to the same network.

The processor 120 may set the device axis by categorizing the plurality of devices. For example, the processor 120 may categorize an air conditioner, a fan, or the like as a cooling and heating device, and may categorize a refrigerator, a microwave oven, or the like as a kitchen device. The processor 120 may arrange the devices included in the same category continuously. In addition, the processor 120 may group the devices arranged continuously. Such category information may be stored in the electronic device 100 or the electronic device 100 may generate category information according to a use pattern.

The processor 120 may set the time axis to a predetermined time, and may display the UI. For example, the processor 120 may display a UI indicating the use patterns of the plurality of devices for different days of the week, or may display a UI indicating the use patterns of the plurality of devices for each time for a day. The predetermined time may be selected by the user.

The information related to the use of at least one device may include at least one of information indicating whether the operation state of the at least one device is changed and detailed information on the operation state of the at least one device. For example, when the turned-off smart TV is turned on, it is determined that the operation state of the device is changed. In addition, a viewed channel, a volume level, brightness, or etc. of the smart TV may refer to the detailed information on the operation state of the device.

The information indicating whether the operation state of the device is changed and the detailed information on the operation state of the device may vary according to the type of the device. For example, it may be determined that the operation state of the smart TV is changed when the turned off smart TV is turned on or a channel is changed, or it may be determined that the operation state of the refrigerator is changed when temperature of a fridge is changed. In addition, the detailed information of the smart TV may be a viewed channel, a volume level, brightness, etc., and the detailed information of the refrigerator may be temperature of the fridge or temperature of a freezer.

The processor 120 may group a plurality of devices belonging to a first time section of the time axis on the UI, based on the operation states of the plurality of devices, and may provide the grouped devices, and, in response to the first time section coming, the processor 120 may control the grouped plurality of devices simultaneously. For example, the processor 120 may group the operation states of a main room lamp and a coffee pot based on the operation states of the two devices indicating that the two devices are turned on at 7 a.m. on Monday, and may control a control command to turn on the two devices at 7 a.m. on Tuesday. However, this should not be considered as limiting, and the processor 120 may group the devices according to a repeated operation state. For example, when the operation state indicating that the main room lamp and the coffee pot are turned on at 7 a.m. on Monday is continued for weeks, the processor 120 may group the operation states of the two devices. The processor 120 may group the operation states of the two devices, and may transmit a control command to turn on the two devices at 7 a.m. on next Monday rather than at 7 a.m. on Tuesday. Alternatively, the processor 120 may group a plurality of devices selected by the user according to a user's interaction for grouping.

The processor 120 may display a GUI for visually feeding back information that the plurality of devices are grouped, and, in response to a user interaction of dragging and dropping the GUI in a second time section being inputted, the processor 120 may control the grouped plurality of devices to operate in the second time section in the same way as in the operation states of the first time section. Alternatively, in response to the GUI being touched, the processor 120 may display that the GUI is selected, and, in response to the GUI being touched once more, the processor 120 may inactivate the grouped plurality of devices corresponding to the GUI.

The device axis may be divided into identification information of the plurality of devices and environment information related to the functions of the plurality of devices, and the processor 120 may provide detailed environment information corresponding to the environment information in a region where the environment information of the device axis and the time axis intersect each other.

The processor 130 may group a plurality of devices and detailed environment information belonging to a third time section of the time axis on the UI, based on the operation states of the plurality of devices, and may provide the grouped devices, and, in response to the third time section in which an ambient environment matches the detailed environment coming, the processor 120 may control the grouped plurality of devices to operate in the same way as in the operation state of the third time section.

Herein, the environment information may include at least one of weather, indoor temperature, outdoor temperature, humidity, and illuminance.

In response to a pinch-in interaction being inputted on any one of the regions where the device axis and the time axis intersect each other, the processor 120 may display detailed information on the device corresponding to the device axis, and a guide message according to the environment information included in the time axis. For example, the processor 120 may display using hours, an amount of power, a power rate, etc. of the device as the detailed information of the device. Alternatively, the processor 120 may display a guide message asking the user to bring an umbrella according to environment information indicating that a rainfall probability is high.

In response to a pinch-in interaction being inputted in the device axis direction, the processor 120 may group the plurality of devices according to types of the devices, and may categorize the grouped devices according to the type and display the devices, and, in response to a pinch-out interaction being inputted in the device axis direction, the processor 120 may display the detailed information of the plurality of devices. For example, the processor 120 may group the fan and the air conditioner as a cooling device, and may display an average use pattern of the cooling device. In this case, the processor 120 may present the device axis as a cooling device, a kitchen device, a multimedia device, a cleaning device, etc. Herein, in response to the pinch-in interaction being inputted once more, the processor 120 may group the above-described groups once more. For example, the processor 120 may group the cooling device, the kitchen device, and the cleaning device as a household appliance.

In response to a pinch-in or pinch-out interaction being inputted in the time axis direction, the processor 120 may change the time unit of the time axis, and may change the information related to the use of the displayed at least one device to information corresponding to the changed time unit, and may display the information. The time unit may be o'clock, day, week, month, year, etc., or may be a specific period designated by the user.

Figure 2B:
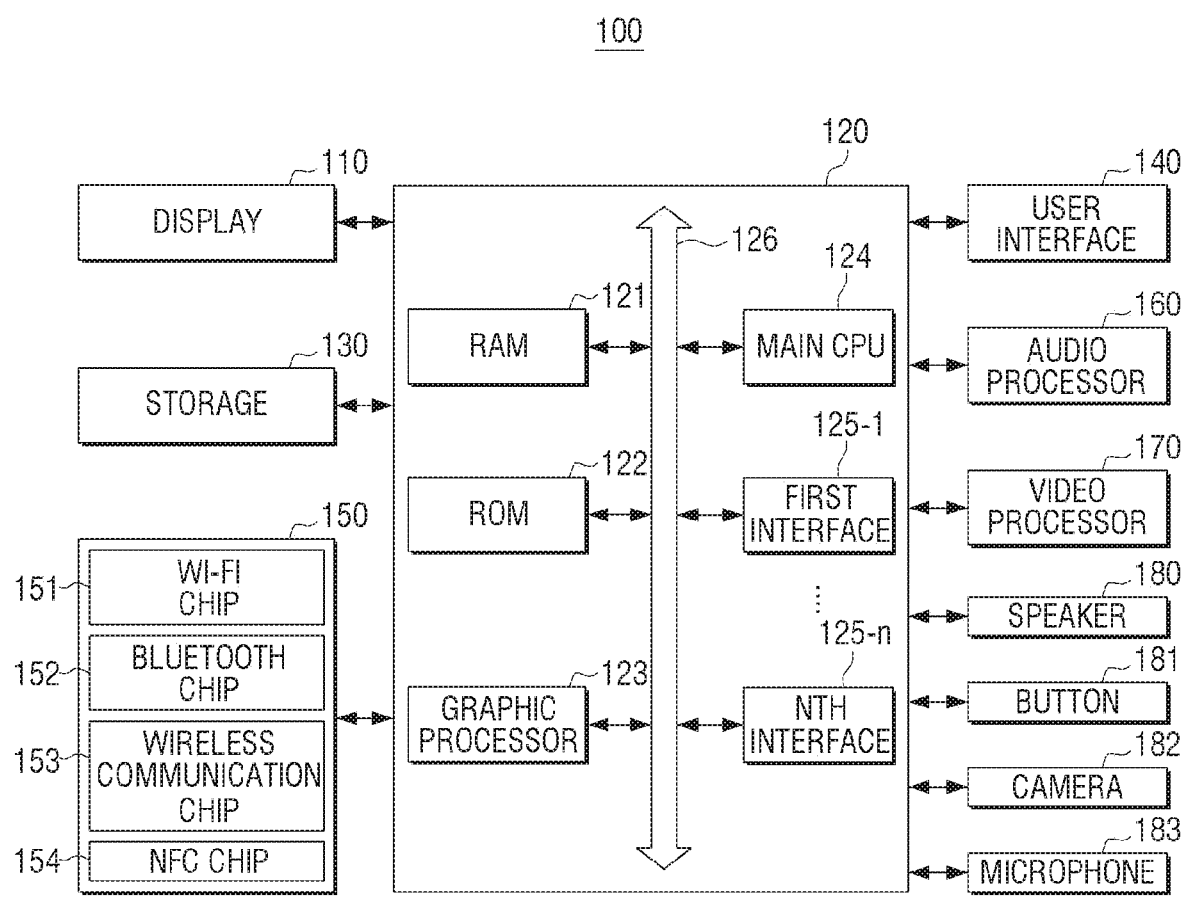

FIG. 2B is a block diagram showing an example of a detailed configuration of the electronic device 100. Referring to FIG. 2B, the electronic device 100 may include a display 110, a processor 120, a storage 130, a user interface 140, a communication unit 150, an audio processor 160, a video processor 170, a speaker 180, a button 181, a camera 182, and a microphone 183. From among the elements illustrated in FIG. 2B, the same elements as those in FIG. 2A will not be described in detail.

The processor 120 may control the overall operation of the electronic device 100 by using various programs stored in the storage 130.

Specifically, the processor 120 includes a random access memory (RAM) 121, a read only memory (ROM) 122, a main central processing unit (CPU) 123, a graphic processor 124, first to nth interfaces 125-1 to 125-n, and a bus 126.

The RAM 121, the ROM 122, the main CPU 123, the graphic processor 124, and the first to nth interfaces 125-1 to 125-n may be connected with one another via the bus 126.

The first to nth interfaces 125-1 to 125-n may be connected with the above-described elements. One of the interfaces may be a network interface connected to an external device via a network.

The main CPU 123 may access the storage 130 and performs booting using an operating system (O/S) stored in the storage 130. In addition, the main CPU 123 performs various operations by using various programs stored in the storage 130.

The ROM 122 stores a set of instructions for booting a system. In response to a turn-on command being inputted and power being supplied, the main CPU 123 copies the O/S stored in the storage 130 onto the RAM 121 according to the instruction stored in the ROM 122, executes the O/S and boots the system. In response to booting being completed, the main CPU 123 copies various application programs stored in the storage 130 onto the RAM 121, executes the programs copied onto the RAM 121, and performs various operations.

The graphic processor 124 may generate a screen including various objects such as an icon, an image, a text, and the like, by using a calculator (not shown) and a renderer (not shown). The calculator (not shown) calculates attribute values of the objects to be displayed, such as coordinate values, shape, size, color, and the like, according to the layout of the screen, based on a received control command. The renderer (not shown) generates a screen of various layouts including the objects based on the attribute values calculated by the calculator. The screen generated by the renderer (not shown) may be displayed on a display region of the display 110.

The above-described operations of the processor 120 may be performed by a program stored in the storage 130.

The storage 130 may store various data such as an O/S software module for driving the electronic device 100, a UI module, information on the use patterns of the plurality of devices, etc. In particular, the storage 130 may store information on the groups classified according to the types of the plurality of devices. Such information may be received from an external device or may be set by the user.

In this case, the processor 120 may process and display an inputted image based on information stored in the storage 130.

The user interface 140 may receive various user interactions. When the electronic device 100 is implemented by using a touch-based portable terminal, the user interface 140 may be implemented by using a touch screen forming an interlayered structure with a touch pad. In this case, the user interface 140 may be used as the above-described display 110.

The communication unit 150 is configured to communicate with various kinds of external devices in various communication methods. The communication unit 150 includes a WiFi chip 151, a Bluetooth chip 152, a wireless communication chip 153, a near field communication (NFC) chip 154, or the like. The processor 120 may communicate with various kinds of external devices using the communication unit 150.

The WiFi chip 151 and the Bluetooth chip 152 communicate in a WiFi method and a Bluetooth method, respectively. When the WiFi chip 151 or the Bluetooth chip 152 is used, a variety of connection information such as an SSID and a session key may be exchanged first, and communication may be established using the connection information, and then a variety of information may be exchanged. The wireless communication chip 153 refers to a chip which communicates according to various communication standards such as IEEE, Zigbee, 3rd generation (3G), $3^{rd}$ generation partnership project (3GPP), long term evolution (LTE), and the like. The NFC chip 154 refers to a chip which operates in an NFC method using a band of 13.56 MHz from among various RF-ID frequency bands such as 135 kHz, 13.56 MHz, 433 MHz, 860-960 MHz, and 2.45 GHz.

The communication unit 150 may perform unidirectional communication or bidirectional communication with an external device. When performing the unidirectional communication, the communication unit 150 may receive signals from the external device. When performing the bidirectional communication, the communication unit 150 may receive signals from the external device and may transmit signals to the external device.

The audio processor 160 is an element for processing audio data. The audio processor 160 may perform various processing operations such as decoding, amplifying, noise filtering, or the like with respect to the audio data.

The video processor 170 is an element for processing video data. The video processor 170 may perform various image processing operations such as decoding, scaling, noise filtering, frame rate conversion, resolution conversion, or the like with respect to the video data.

The speaker 180 is an element which outputs various notification sounds or voice messages as well as various audio data processed in the audio processor 160.

The button 181 may be various types of buttons formed on a certain area of an exterior of a main body of the electronic device 100, such as a front surface, a side surface, a rear surface, or like, for example, a mechanical button, a touch pad, a wheel, or the like.

The camera 182 is configured to capture a still image or a moving image under the control of the user. The camera 182 may be implemented in plural number, including a front surface camera and a rear surface camera.

The microphone 183 is configured to receive a user voice or other sounds and convert them into audio data.

In addition, according to an exemplary embodiment, the electronic device 100 may further include a USB port to which a USB connector is connected, various external input ports for connecting with various external terminals, such as a headset, a mouse, a local area network (LAN), etc., a digital multimedia broadcasting (DMB) chip for receiving and processing a DMB signal, various sensors, etc., although they are not illustrated in FIG. 2B.

Hereinafter, a basic configuration for easy understanding of the present disclosure and various exemplary embodiments will be described.

Figure 3A:
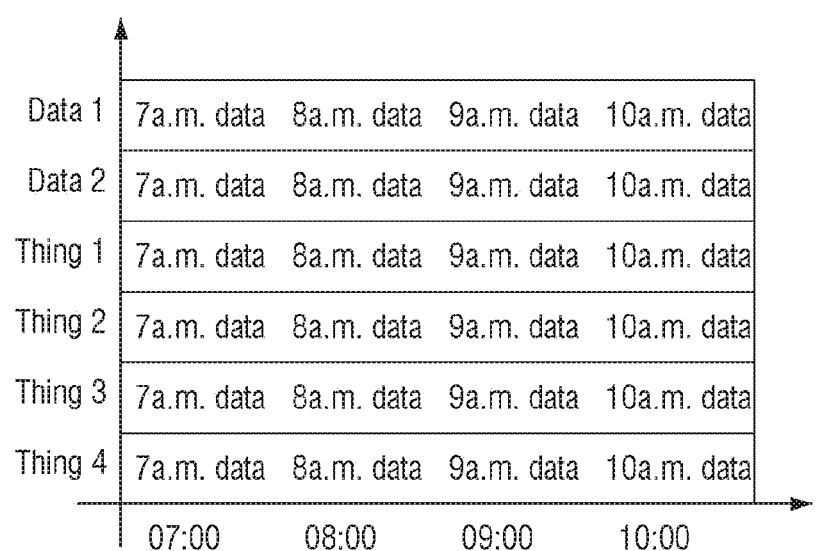
FIGS. 3A and 3B are views showing an example of a method for providing a UI in an electronic device.
Figure 3B:
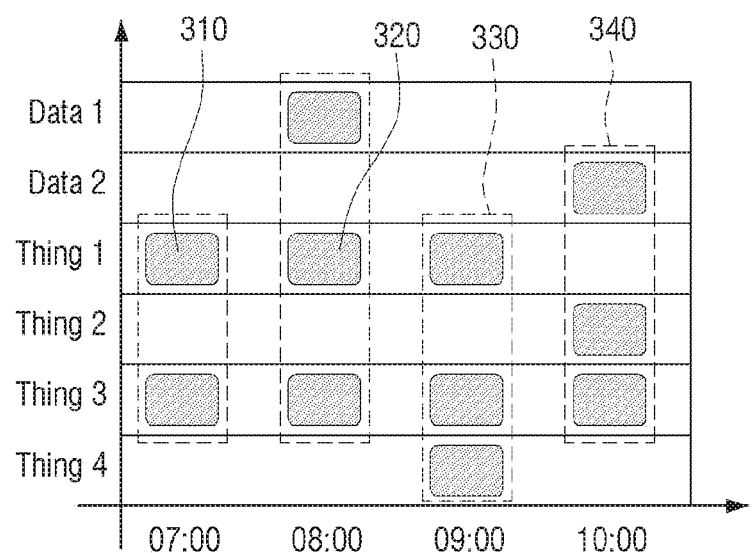

FIGS. 3A and 3B are views showing an example of a method for providing a UI in the electronic device 100.

As shown in FIG. 3A, the processor 120 may display, through the display 110, a UI which includes a device axis and a time axis and provides information related to the use of at least one device in a region where the device axis and the time axis intersect each other, based on use patterns of a plurality of devices connected to the same network. For example, the processor 120 may display the use patterns of the plurality of devices according to each time section.

Herein, the information related to the use of the at least one device may be detailed information on the operation state of the at least one device. For example, the processor 120 may display using hours, a using mode (a normal mode, a bedding mode, a delicate mode, etc.), etc. of the washing machine as detailed information.

Alternatively, the information related to the use of the at least one device may be information indicating whether the operation state of the at least one device is changed as shown in FIG. 3B. For example, according to a use pattern in which device 1 (Thing 1) is turned on at 7 o'clock (310) and is turned off at 8 o'clock (320), the processor 120 may indicate that the operation state is changed at a corresponding time. Device 1 does not change the operation state at 10 o'clock, and the processor 120 may not display anything at 10 o'clock of device 1. In the above-described example, it is determined whether the operation state is changed only based on the turning on and turning off operations, but this should not be considered as limiting. For example, in the case of the air conditioner, the processor 120 may determine that the operation state is changed based on a change in temperature, and, in the case of the smart TV, the processor 120 may determine that the operation state is changed based on a change in a channel or a volume.

Alternatively, the processor 120 may display a UI including both the information indicating whether the operation state of the at least one device is changed and the detailed information on the operation state of the at least one device.

In response to a new device being detected, the processor 120 may determine a position for displaying the new device, based on information stored in the storage 130. The processor 120 may determine a type of the new device based on a product name, a manufacture number, a serial number, etc. of the new device. For example, when the type of the new device is a refrigerator, the processor 120 may display a use pattern of the refrigerator in the proximity of the other kitchen devices displayed.

Alternatively, in response to a new device being detected, the processor 120 may classify the new device based on an existing use pattern and a use pattern of the new device. For example, in response to there being use pattern information indicating that a kitchen lamp and an oven are turned on at 7 a.m., and the detected new device being repeatedly used at 7 a.m., the processor 120 may place the new device in the proximity of the kitchen lamp and the oven, and may display use pattern information on the new device.

The processor 120 may group a plurality of devices belonging to the same time section of the time axis on the UI, based on the operation states of the plurality of devices, and may provide the groups. In particular, the processor 120 may display a GUI for visually feeding back information indicating that the plurality of devices are grouped. For example, the processor 120 may group device 1 (Thing 1), device 3 (Thing 3), and device 4 (Thing 4) based on that their operations states are changed at 9 o'clock, and may display a GUI 330 for visually feeding back information indicating that the corresponding devices are grouped. Alternatively, the processor 120 may group device 1 (Thing 1), device 3 (Thing 3), and device 4 (Thing 4) only in response to the change in the operation states of the corresponding devices at 9 o'clock being repeated more than a predetermined number of times. Alternatively, the processor 120 may group the corresponding devices in response to there being a user's input for grouping.

The processor 120 may divide the device axis into identification information of the plurality of devices and environment information related to the functions of the plurality of devices, and may display the same. The processor 120 may provide detailed environment information corresponding to environment information in a region where the environment information of the device axis and the time axis intersect each other.

Herein, the environment information may include at least one of weather, indoor temperature, outdoor temperature, humidity, and illuminance. For example, the processor 120 may display temperature, humidity information, etc. according to each time section. The processor 120 may receive the environment information from at least one of the plurality of devices, sensors connected to the IoT system 10, and an external server. Alternatively, the processor 120 may directly measure environment information.

Alternatively, the processor 120 may display that temperature, humidity, etc. is changed according to each time section. For example, in response to temperature being increased from 20 degrees to 21 degrees, the processor 120 may display that the temperature is changed in a corresponding time section. Alternatively, the processor 120 may set a specific section for every environment information, and may determine whether the environment information is changed. For example, the processor 120 may set a plurality of sections of temperature on a basis of 5 degrees, and may determine that the temperature is not changed in response to the temperature being changed from 20 degrees to 25 degrees.

According to a user interaction of touching a certain point of the displayed UI, the processor 120 may change a control command of a device corresponding to the corresponding point. For example, the processor 120 may generate a control command by touching a point corresponding to the smart TV of 7 p.m. A detailed description of this will be provided below.

The processor 120 may group a plurality of devices and detailed environment information belonging to the same time section of the time axis on the UI, based on the operation states of the plurality of devices, and provide the group. In particular, the processor 120 may display a GUI for visually feeding back information indicating that the plurality of devices and the detailed environment information are grouped. For example, the processor 120 may group device 2 (Thing 2), device 3 (Thing 3), and detailed environment information 2 (Data 2) based on that the operation states of the corresponding device and the detailed environment information 2 (Data 2) are changed at 10 o'clock, and may display a GUI 340 for visually feeding back information indicating that the corresponding devices and the detailed environment information are grouped. Alternatively, the processor 120 may group device 1 (Thing 1), device 3 (Thing 3), and device 4 (Thing 4) and detailed environment information 2 (Data 2) only in response to the change in the operation states of the corresponding devices and the detailed environment information at 9 o'clock being repeated more than a predetermined number of times. Alternatively, the processor 120 may group the corresponding devices and the detailed environment information in response to there being a user's input for grouping. A method for controlling the grouped plurality of devices by using the GUI will be described below.

Figure 4:
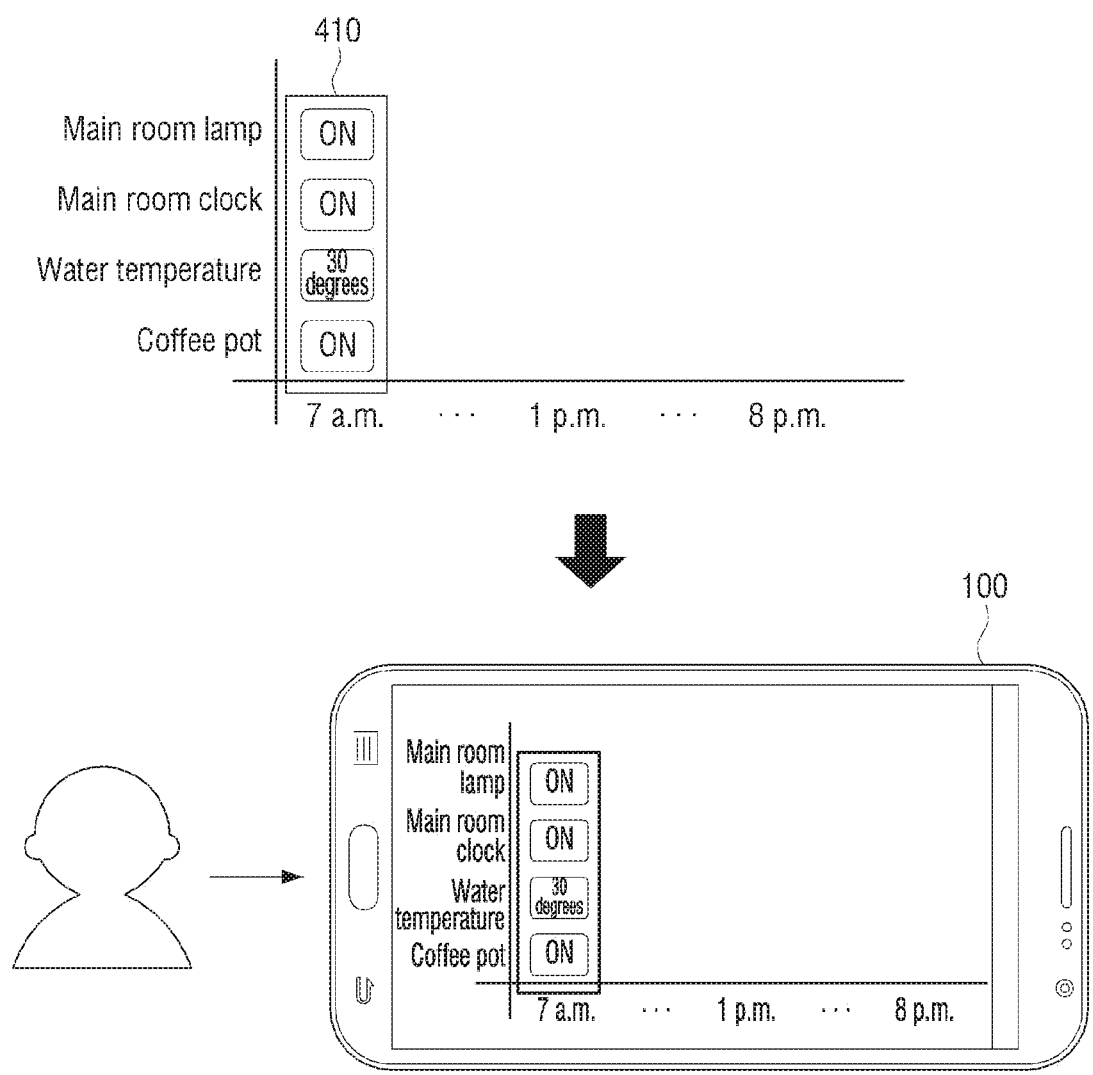
FIG. 4 is a view to illustrate a method for controlling a plurality of devices according to an exemplary embodiment of the present disclosure.

FIG. 4 is a view to illustrate a method for controlling a plurality of devices according to an exemplary embodiment of the present disclosure.

As shown in FIG. 4, the processor 120 may group a plurality of devices belonging to the first time section of the time axis on the UI, based on the operation states of the plurality of devices, and may provide the group and, in response to the first time section coming, the processor 120 may control the grouped plurality of devices simultaneously. For example, the processor 120 may control such that a main room lamp, a main room clock, and a coffee pot are turned on and temperature of water is adjusted to 30 degrees at 7 a.m. of the next day, based on a use pattern 410 indicating that the main room lamp, the main room clock, and the coffee pot are turned on and water is used at temperature of 30 degrees at 7 a.m.

Alternatively, the processor 120 may control such that the plurality of devices operate in the same way at 7 a.m. on the same day after a week or on the same date after a month. The user may set a time at which the processor 120 controls the plurality of devices.

In response to the use pattern in which the main room lamp, the main room clock, and the coffee pot are turned on and the water temperature is 30 degrees at 7 a.m. being repeated multiple times, the processor 120 may control the plurality of devices using the corresponding use pattern. For example, in response to the same pattern being repeated more than three times at 7 a.m., the processor 120 may control the plurality of devices using the corresponding use pattern.

A time section for determining whether the use pattern is repeated may be a one-hour basis. For example, the processor 120 may determine use of a device from 7 a.m. to 7:59 a.m. as the use pattern of the 7 o'clock time section. Accordingly, the processor 120 may determine both a case in which the main room lamp is turned on at 7 a.m. and a case in which the main room lamp is turned on at 7:30 a.m. as the use pattern of the same time section. The time section may be set by the user.

Figure 5:
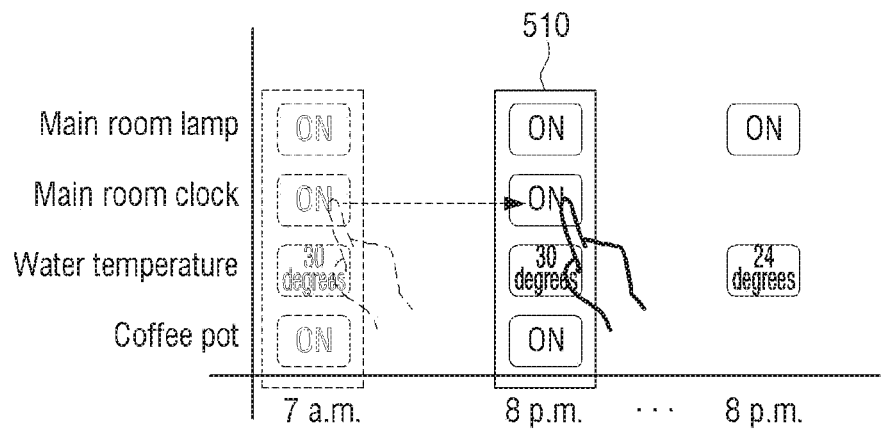
FIG. 5 is a view to illustrate an operation according to grouping according to an exemplary embodiment of the present disclosure.

FIG. 5 is a view to illustrate an operation according to grouping according to an exemplary embodiment of the present disclosure.

As shown in FIG. 5, the processor 120 may display a GUI 510 for visually feeding back information indicating that a plurality of devices are grouped, and, in response to a user interaction of dragging the GUI 510 and dropping it into the second time section being inputted, the processor 120 may control such that the grouped plurality of devices operate in the second time section in the same operation states as in the first time section. For example, in response to an interaction of dragging the GUI 510 grouping the use patterns of the plurality of devices at 7 a.m. and dropping the GUI 510 into the 8 p.m. section being inputted, the processor 120 may control such that the operations of the plurality of devices at 7 a.m. are performed in the same way at 8 p.m.

The processor 120 may change the operation states of the first time section to the second time section and store the operation states according to a drag and drop interaction. In response to the second time section coming, the processor 120 may transmit a control command based on the stored information.

The processor 120 may change the operations states of the first time section to the second time section and store the same according to a drag and drop interaction, and may control such that the operation states of the plurality of devices are not changed in the first time section. However, this should not be considered as limiting. The processor 120 may copy the operation states of the first time section into the second time section, and may control the plurality of devices to operate according to the use patterns in the first time section. Accordingly, the operation states of the plurality of devices may be equally used in another time section.

Figure 6:
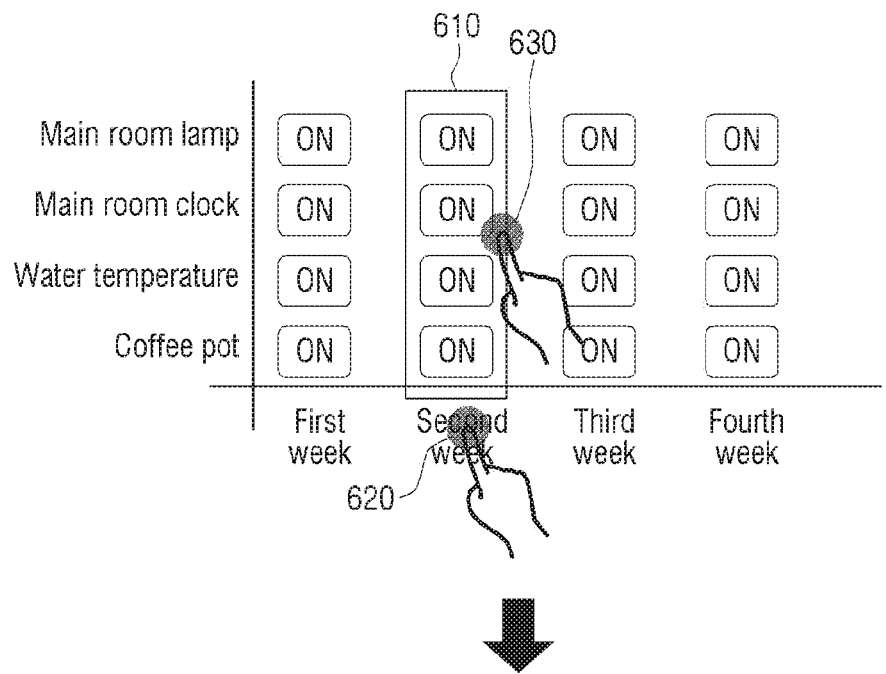
FIG. 6 is a view to illustrate an operation according to grouping according to another exemplary embodiment of the present disclosure.
Figure 6:
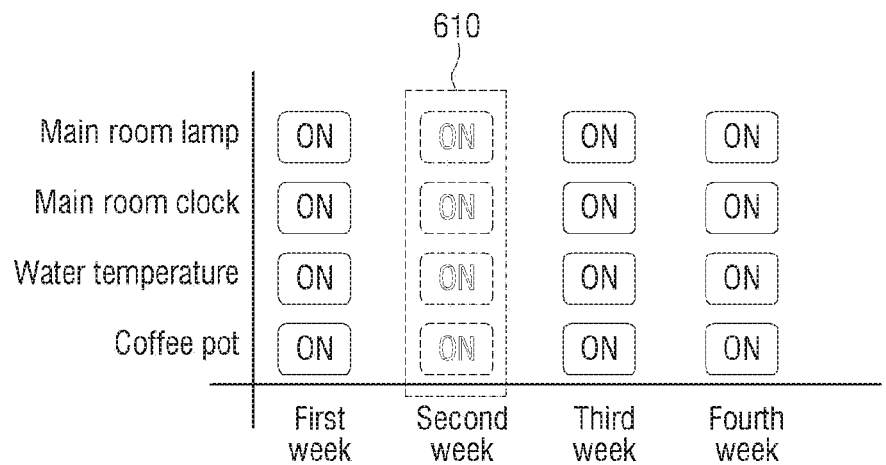

FIG. 6 is a view to illustrate an operation according to grouping according to another exemplary embodiment of the present disclosure.

Referring to FIG. 6, the processor 120 may display a GUI 610 for visually feeding back information indicating that a plurality of devices are grouped, and, in response to a user interaction of touching a time section 620 of the GUI 610 being inputted, the processor 120 may indicate that the corresponding GUI 610 is selected. For example, the processor 120 may change the color of the border of the corresponding GUI 610 or may shade the inside of the corresponding GUI 610.

In response to a user interaction of touching a point 630 of the selected GUI 610 being inputted, the processor 120 may not change the operation states of the plurality of devices during the time section of the selected GUI 610. The processor 120 may not change the operation states of the plurality of devices on a one off basis. For example, the processor 120 may not change the operation states of the plurality of devices during the second week, but may change the operation states of the plurality of devices during the second week of the next month. Alternatively, the processor 120 may delete the operation states of the plurality of devices in the corresponding time section, and may not change the operation states permanently. However, in response to a new use pattern being repeated, the processor 120 may display the new use pattern in the corresponding time section.

Alternatively, the processor 120 may inactivate the plurality of devices during the time section of the selected GUI 610. For example, the processor 120 may turn off all of the plurality of devices, rather than changing the operation states of the plurality of devices. In this case, there may be a difference between the operation state in which the turned-on device is turned off and the operation state in which setting of the turned-on device is changed.

Figure 7:
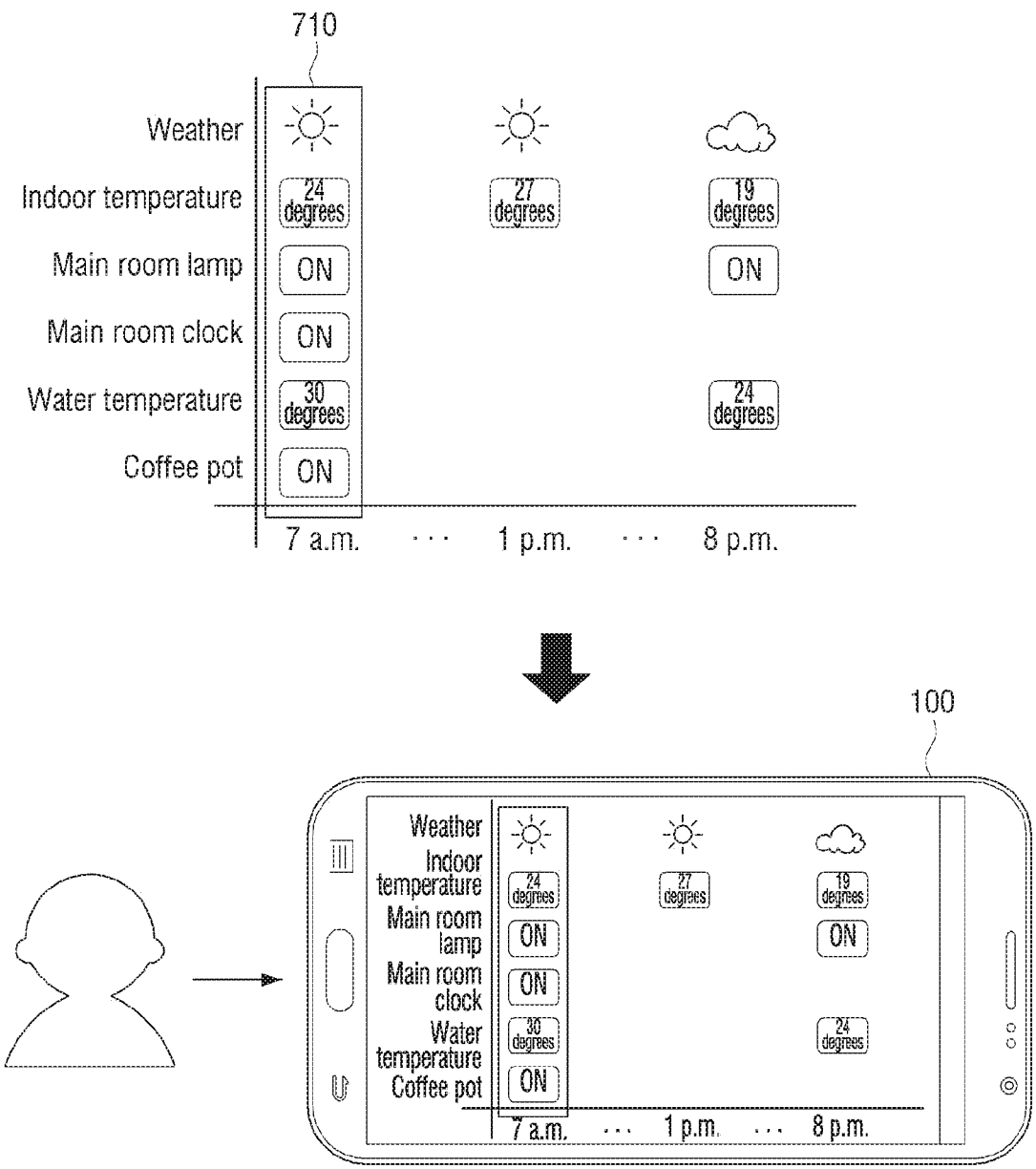
FIG. 7 is a view to illustrate a method for using environment information according to an exemplary embodiment of the present disclosure.

FIG. 7 is a view to illustrate a method for using environment information according to an exemplary embodiment of the present disclosure.

Referring to FIG. 7, the device axis may be divided into identification information of a plurality of devices and environment information related to the functions of the plurality of devices, and the processor 120 may provide detailed environment information corresponding to environment information in a region where the environment information of the device axis and the time axis intersect each other. Herein, the environment information may include at least one of weather, indoor temperature, outdoor temperature, humidity, and illuminance.

The processor 120 may group a plurality of devices and detailed environment information belonging to the third time section of the time axis on a UI, based on the operation states of the plurality of devices, and may provide the group. The processor 120 may display a GUI 710 for visually feeding back information indicating that the plurality of devices and the detailed environment information are grouped. For example, the processor 120 may group a use pattern 410 indicating that the main room lamp, the main room clock, and the coffee pot are turned on and water temperature is 30 degrees at 7 a.m., and sunny weather and indoor temperature of 24 degrees.

In response to the third time section in which an ambient environment is the same as the detailed environment coming, the processor 120 may control the grouped plurality of devices to operate in the same operation states as in the third time section. For example, in response to the weather being sunny and the indoor temperature being 24 degrees at 7 a.m. of the next day, the processor 120 may control such that the main room lamp, the main room clock, and the coffee pot are turned on and water temperature is adjusted to 30 degrees. However, this should not be considered as limiting, and the processor 120 may control the plurality of devices only based on the environment information. For example, in response to weather being sunny and the indoor temperature being 24 degrees although it is not 7 o'clock in the morning, the processor 120 may control such that the main room lamp, the main room clock, and the coffee pot are turned on and water temperature is adjusted to 30 degrees.

The processor 120 may group only some devices related to specific environment information. For example, the processor 120 may group temperature information of environment information and an air conditioner and a fan. Alternatively, the processor 120 may a group a fine dust concentration of the environment information and a cleaner.

A configuration for controlling the operations of the plurality of devices by using the GUI 710 is the same as described above, and a description thereof is omitted.

Figure 8:
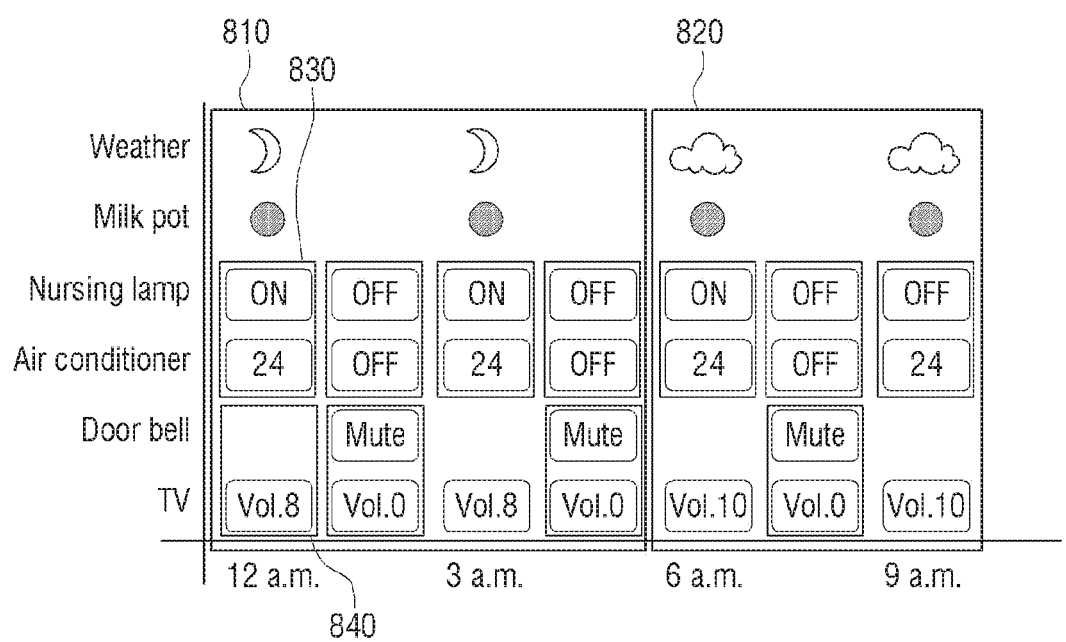
FIG. 8 is a view to illustrate a conditional operation according to an exemplary embodiment of the present disclosure.

FIG. 8 is a view to illustrate a conditional operation according to an exemplary embodiment of the present disclosure.

As shown in FIG. 8, in response to an operation state of a device being changed, the processor 120 may change operation states of the other devices in sequence. For example, in response to a milk pot being used at 12 a.m., the processor 120 may turn on a nursing lamp and control the air conditioner to reach 24 degrees. In addition, in response to the nursing lamp being turned on, the processor 120 may unmute a door bell and a smart TV.

In response to the use of the milk pot being stopped, the processor 120 may control the nursing lamp and the air conditioner to be turned off. In addition, in response to the nursing lamp being turned off, the processor 120 may mute the door bell and the smart TV. The processor 120 may execute such a conditional operation based on a repeated use pattern. Alternatively, the conditional operation may be stored by the user.

The processor 120 may indicate that the conditional operation is performed by displaying an arrow (not shown) on the plurality of devices which perform the conditional operation. For example, the processor 120 may display an arrow from the milk pot to a region 830 indicating the nursing lamp and the air conditioner of 12 a.m. In addition, the processor 120 may display an arrow from the region 830 indicating the nursing lamp and the air conditioner of 12 a.m. to a region 840 indicating the door bell and the smart TV of 12 a.m.

The processor 120 may distinguish between a night region 810 and a day region 820 and may cause the night region 810 and the day region 820 to operate differently. For example, in response to the milk pot being used at 9 a.m., the processor 120 may turn off the nursing lamp. Herein, the temporal division between the night region 810 and the day region 820 may be set by the user.

Figure 9:
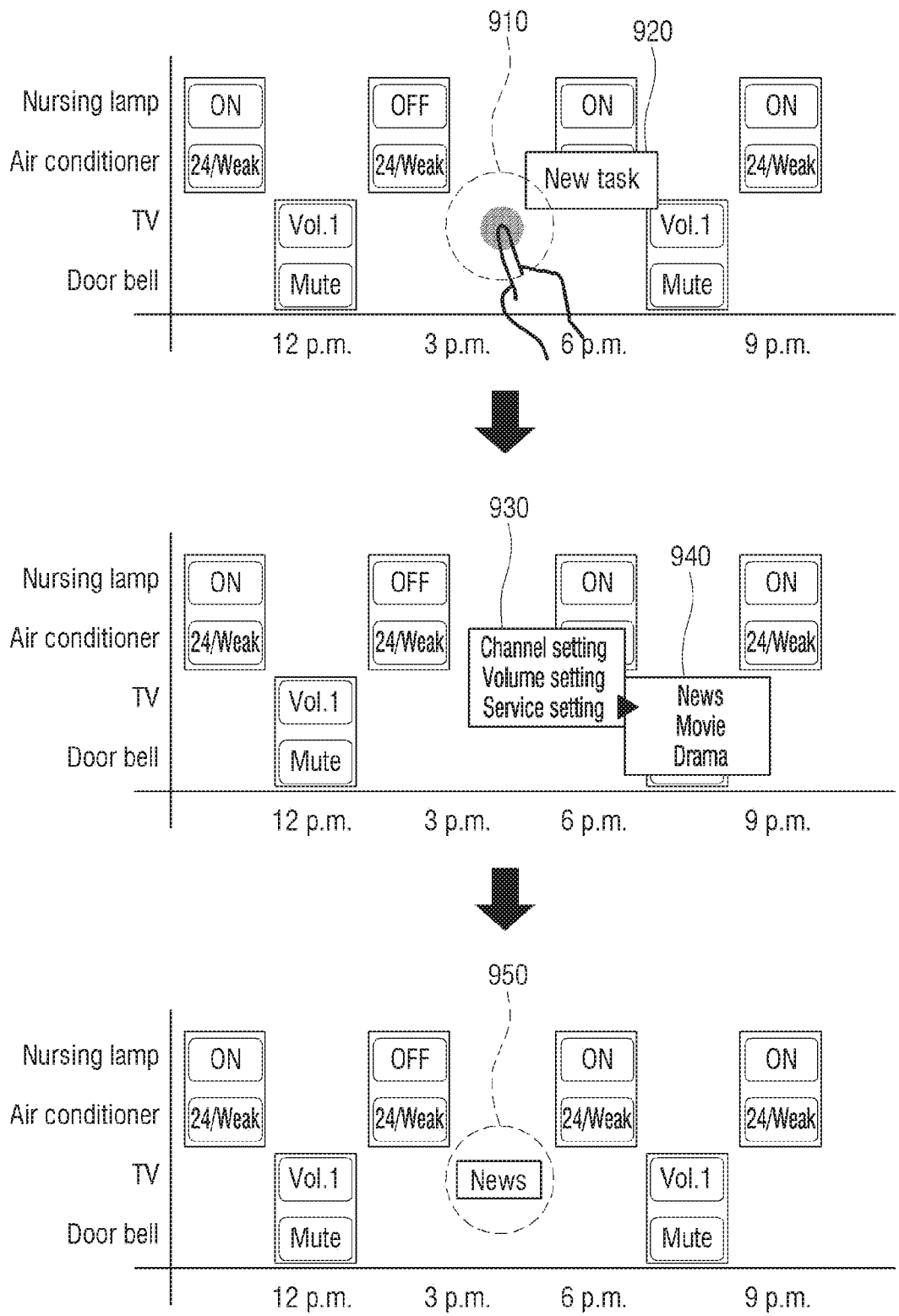
FIG. 9 is a view to illustrate a method for controlling an operation of a specific device at a specific time according to an exemplary embodiment of the present disclosure.

FIG. 9 is a view to illustrate a method for controlling an operation of a specific device at a specific time according to an exemplary embodiment of the present disclosure.

As described above, the processor 120 may control a plurality of devices based on use pattern information of the plurality of devices. Alternatively, the processor 120 may control the plurality of devices through user's setting.

As shown in FIG. 9, in response to an interaction of touching a region and keeping touching on a displayed UI being inputted, the processor 120 may determine whether a use pattern is set on the corresponding region, first.

In response to a use pattern not being set on the corresponding region, the processor 120 may provide a menu for setting a new use pattern. For example, in response to an interaction of touching a region 910 corresponding to the smart TV of 3 p.m. and keeping touching being inputted, the processor 120 may display a new task generation menu (New task) 920. In addition, in response to the new task generation menu (New task) 920 being selected, the processor 120 may display a menu 930 including channel setting, volume setting, and service setting. In response to the service setting being selected, the processor 120 may display a sub menu 940 including news, movie, and drama. In addition, in response to the news being selected, the processor 120 may finally display a GUI 950 indicating that a new use pattern is set. In the above-described example, the smart TV has been described by way of an example, but a menu type and contents may be changed according to a device.

In response to a use pattern being set on the corresponding region, the processor 120 may display a menu for changing the use pattern to induce a user command. For example, the processor 120 may toggle on or off a device which is simply turned on or off according to a touch input. Alternatively, in response to there being various selection options such as an operation for setting a specific numeric value, the processor 120 may display a corresponding menu. In addition, as described above, a hierarchical menu may be displayed.

Figure 10:
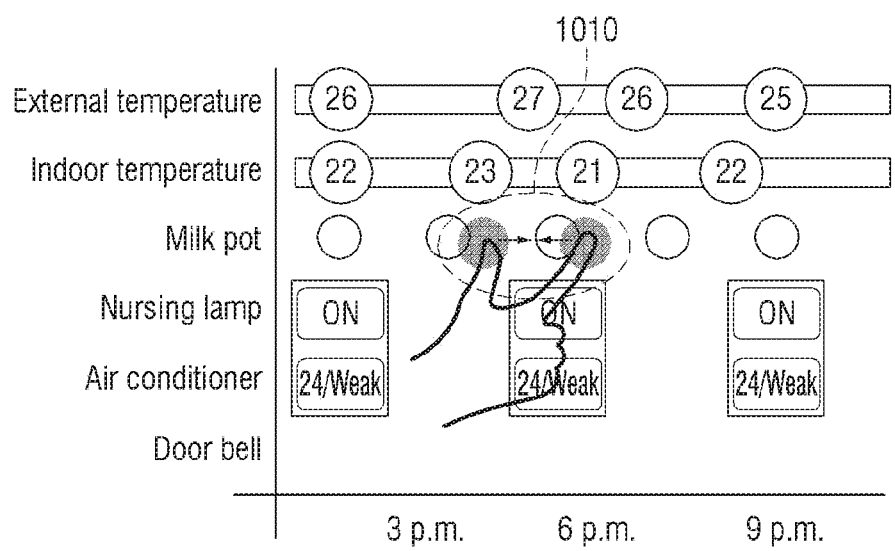
FIG. 10 is a view to illustrate a method for providing detailed information, etc. according to an exemplary embodiment of the present disclosure.
Figure 10:
Figure 10:
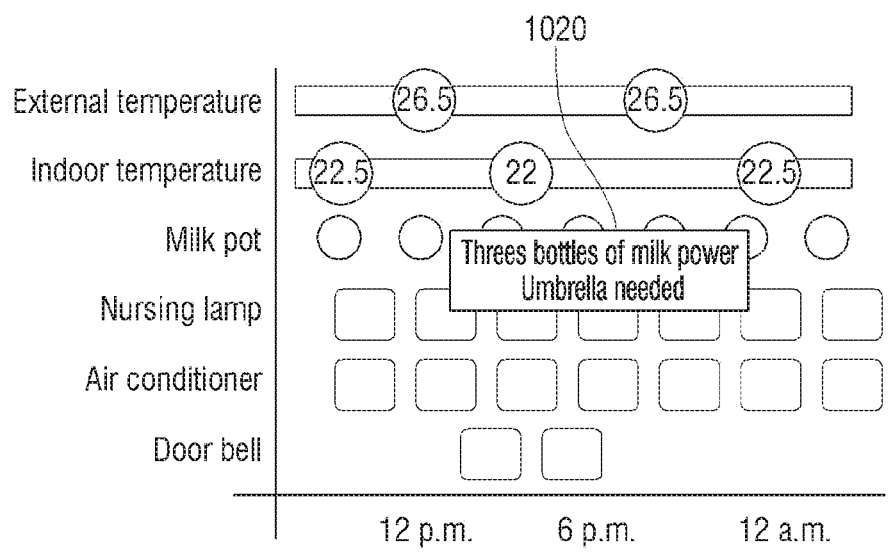

FIG. 10 is a view to illustrate a method for providing detailed information, etc. according to an exemplary embodiment of the present disclosure.

As shown in FIG. 10, in response to a pinch-in interaction being inputted on one of the regions where the device axis and the time axis intersect each other on a displayed UI, the processor 120 may display a guide message according to detailed information on the device corresponding to the device axis and environment information included in the time axis.

The processor 120 may display an operation state, a setting state, an amount of power, a power rate, etc. as detailed information on the device. For example, in response to a pinch-in interaction being inputted on the region corresponding to the milk pot of 6 p.m., the processor 120 may display necessary milk, necessary milk powder, an amount of power, a power rate, etc. as detailed information on the milk pot of 6 p.m. Herein, the processor 120 may store information on the necessary milk, the necessary milk powder, etc. Alternatively, the user may initially set information on the necessary milk, the necessary milk powder, etc.

The processor 120 may display a guide message according to environment information included in the time axis. For example, the processor 120 may display a message saying "Umbrella needed" based on external temperature of 6 p.m. Alternatively, the processor 120 may display a message saying "Air conditioner needed to be driven" or "Ventilation needed" based on indoor temperature of 6 p.m.

Figure 11:
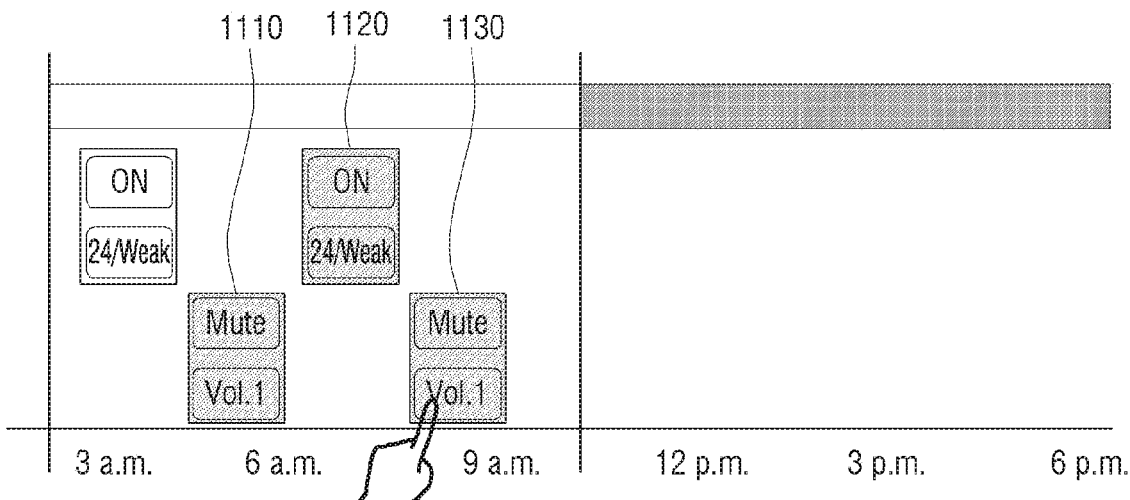
FIG. 11 is a view to illustrate a method for using a plurality of groups according to an exemplary embodiment of the present disclosure.
Figure 11:
Figure 11:
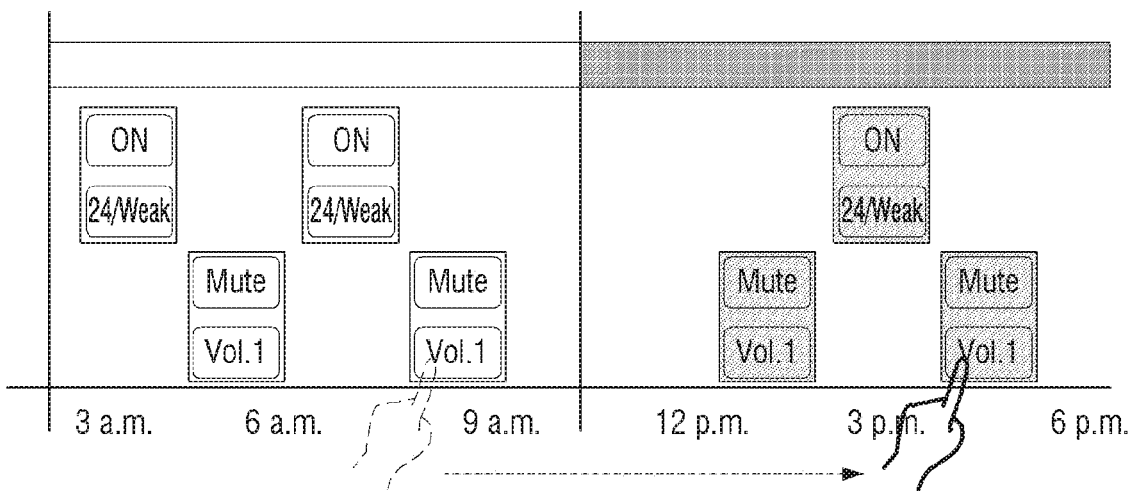

FIG. 11 is a view to illustrate a method for using a plurality of groups according to an exemplary embodiment of the present disclosure.

As shown in FIG. 11, the processor 120 may display a plurality of groups based on use patterns of the plurality of devices. In response to a user interaction of selecting the plurality of groups being inputted, the processor 120 may display the selected plurality of groups 1110, 1120, 1130 to be distinguished from the other groups. For example, the processor 120 may change the colors of the borders of the selected plurality of groups 1110, 1120, 1130, or may shade the insides of the selected plurality of groups 1110, 1120, 1130.

In response to a user interaction of dragging the selected plurality of groups 1110, 1120, 1130 and dropping the same into another time section being inputted, the processor 120 may control the plurality of devices included in the selected plurality of groups 1110, 1120, 1130 to operate in the same way in another time section. A method for using the selected plurality of groups 1110, 1120, 1130 is similar to the above-described method of using the GUI, and thus a detailed description thereof is omitted.

Figure 12:
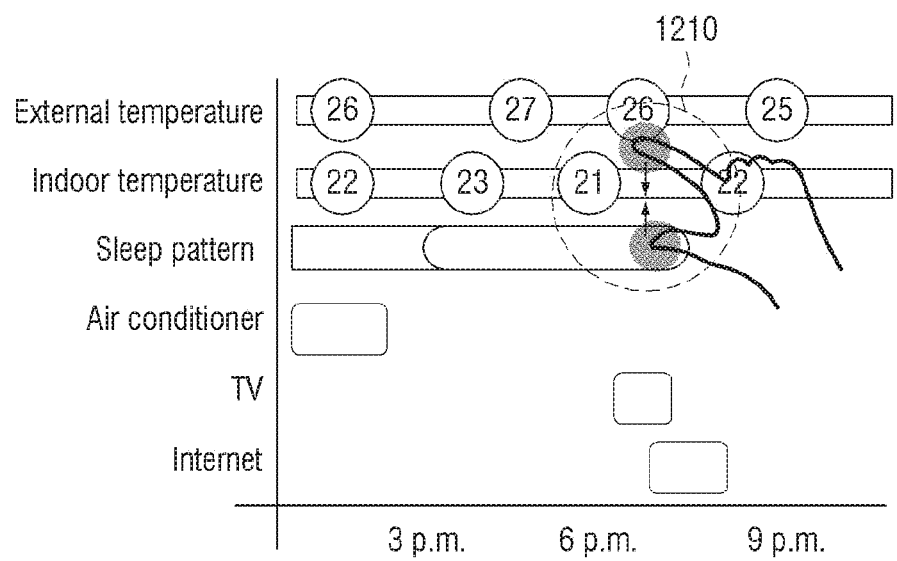
FIG. 12 is a view to illustrate a method for controlling a device using sleep pattern information and environment information according to an exemplary embodiment of the present disclosure.
Figure 12:
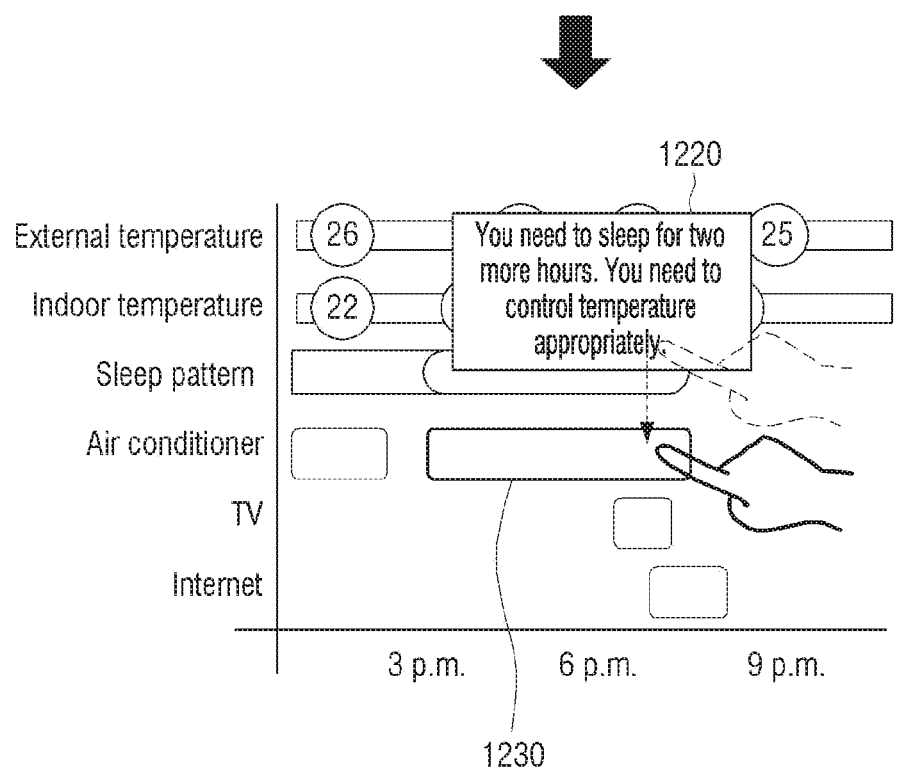

FIG. 12 is a view to illustrate a method for controlling devices using sleep pattern information and environment information according to an exemplary embodiment of the present disclosure.

As shown in FIG. 12, the processor 120 may receive information on a user's sleep state through a sensor, and may display the information. For example, the processor 120 may display user's sleeping hours, etc.

In response to a pinch-in interaction 1210 being inputted on any one of regions indicating sleeping hours, the processor 120 may analyze the user's sleeping hours based on environment information, and may display a result of analyzing. For example, the processor 120 may analyze a lack of sleep based on temperature and humidity information, and may determine that the problem is temperature. In addition, the processor 120 may display a message 1220 saying "You need to sleep for two more hours. You need to control temperature appropriately."

In response to a user interaction of dragging the above-described message 1220 and dropping the message 1220 into a region corresponding to a cooling device being inputted, the processor 120 may automatically control the cooling device. For example, in response to a user interaction of dragging the above-described message 1220 and dropping the message 1220 to a region corresponding to the air conditioner being inputted, the processor 120 may generate a control command to drive the air conditioner or a control command to reduce temperature of the air conditioner, and may display a corresponding GUI 1230. In response to a user interaction of touching the corresponding GUI 1230 being inputted, the processor 120 may display an operation state of the air conditioner.

Such an operation may be performed based on schedule information stored in the electronic device 100. For example, in response to a school exam schedule being stored in the electronic device 100, the processor 120 may reduce using hours related to the smart TV, the Internet during the exam period, and may display the using hours.

Figure 13:
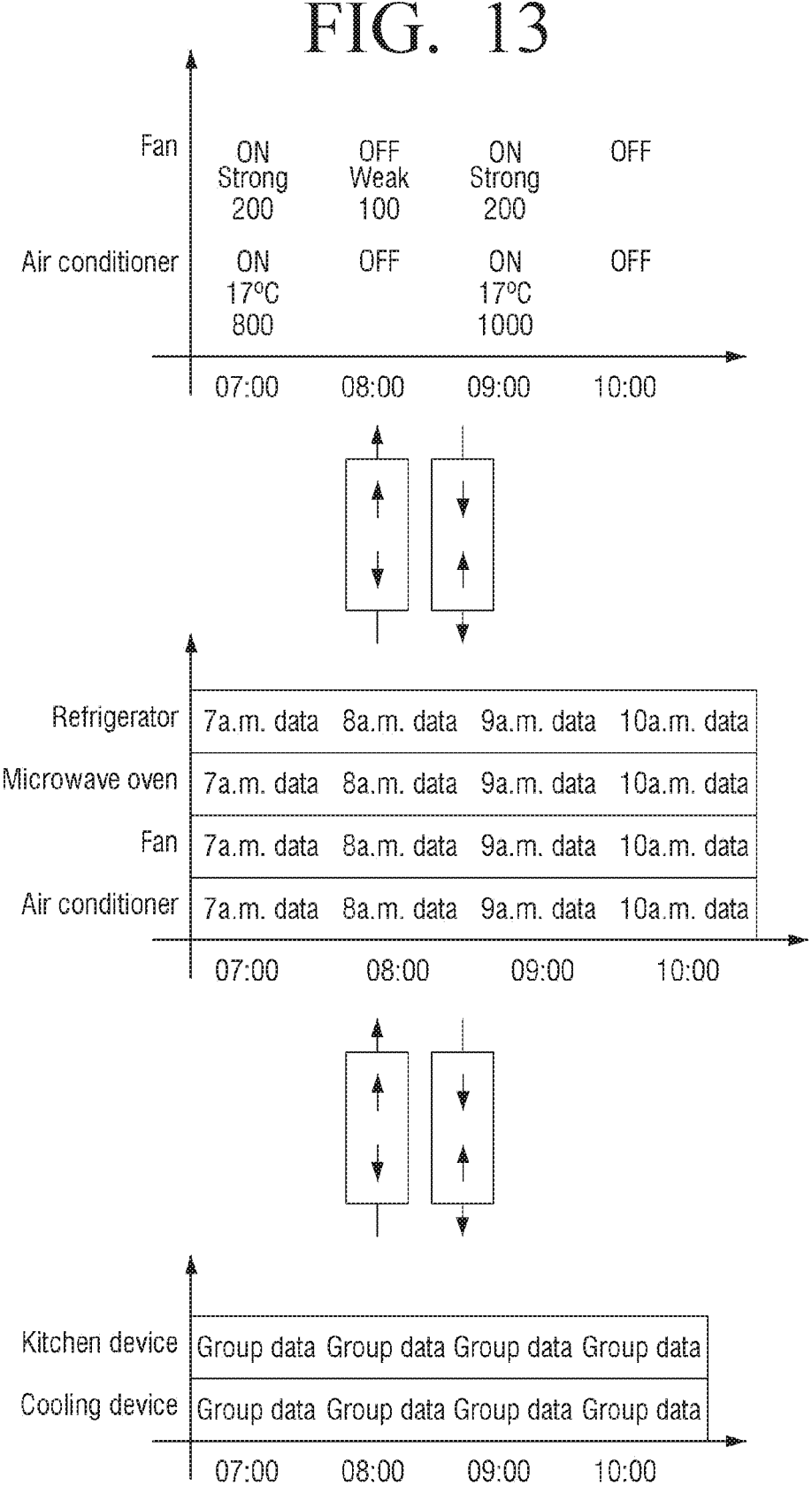
FIG. 13 is a view to illustrate an operation related to a pinch-in or pinch-out interaction in a device axis direction according to an exemplary embodiment of the present disclosure.

FIG. 13 is a view to illustrate an operation related to a pinch-in or pinch-out interaction in the device axis direction according to an exemplary embodiment of the present disclosure.

As shown in FIG. 13, in response to a pinch-in interaction being inputted in the device axis direction, the processor 120 may group the plurality of devices according to types of devices, and may categorize the grouped groups by type and display the groups. For example, the processor 120 may categorize the air conditioner, the fan, the heater, etc. as a cooling and heating device, and may categorize the refrigerator, the microwave oven, etc. as a kitchen device.

The storage 130 may store information indicating that the plurality of devices are divided into a large group, a medium group, a small group, and an individual device. The processor 120 may display a UI screen corresponding to the pinch-in interaction in the device axis direction based on the information stored in the storage 130.

In response to a pinch-out interaction being inputted in the device axis direction, the processor 120 may display detailed information of the plurality of devices. For example, the processor 120 may display using hours, an amount of power, a power rate of a device as detailed information.

In addition, the processor 120 may display a specific setting value for each device. For example, the processor 120 may display channel or volume information of the smart TV, wind strength or rotation information of the fan, etc.

In FIG. 13, the processor 120 may display electronic devices which are grouped into two groups, and detailed information. However, this is merely an example, and other settings are possible. In response to a pinch-out interaction being inputted in the device axis direction with the plurality of groups being displayed, the plurality of groups may be divided into individual devices and the devices may be displayed.

Figure 14:
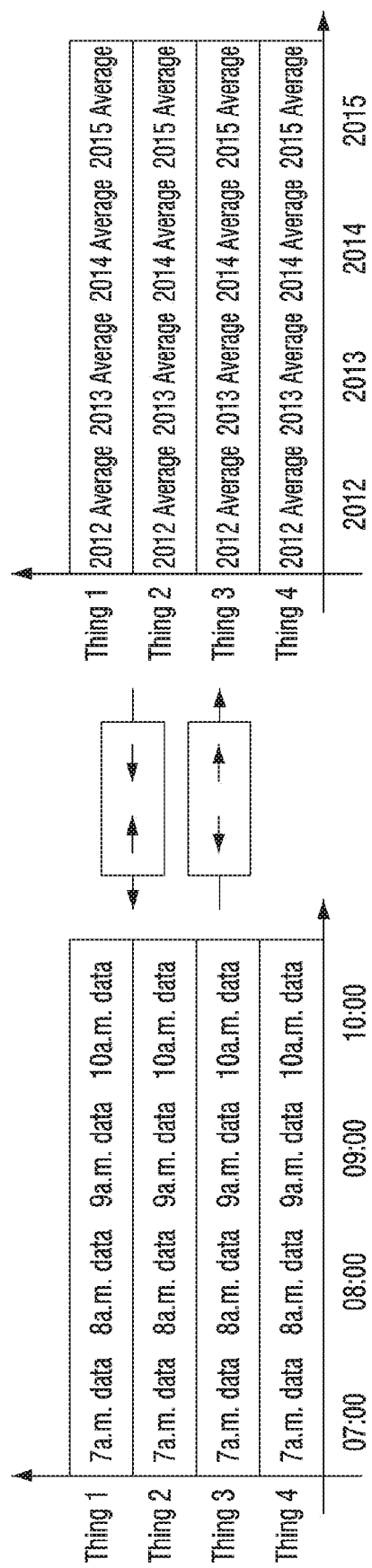
FIG. 14 is a view to illustrate an operation related to a pinch-in or pinch-out interaction in a time axis direction according to an exemplary embodiment of the present disclosure.

FIG. 14 is a view to illustrate an operation related to a pinch-in or pinch out interaction in the time axis direction according to an exemplary embodiment of the present disclosure.

As shown in FIG. 14, in response to a pinch-in or pinch-out interaction being inputted in the time axis direction, the processor 120 may change a time unit of the time axis. For example, the processor 120 may set days for a week or o'clock of one day as the time unit. The time unit may be selected by the user.

The processor 120 may change information related to the use of at least one device displayed to information corresponding to the changed time unit. For example, the processor 120 may change information displayed on an o'clock basis to information of a yearly basis, and may display an average of use patterns. Alternatively, the processor 120 may sample some of the use patterns and display the sampled use patterns.

Figure 15:
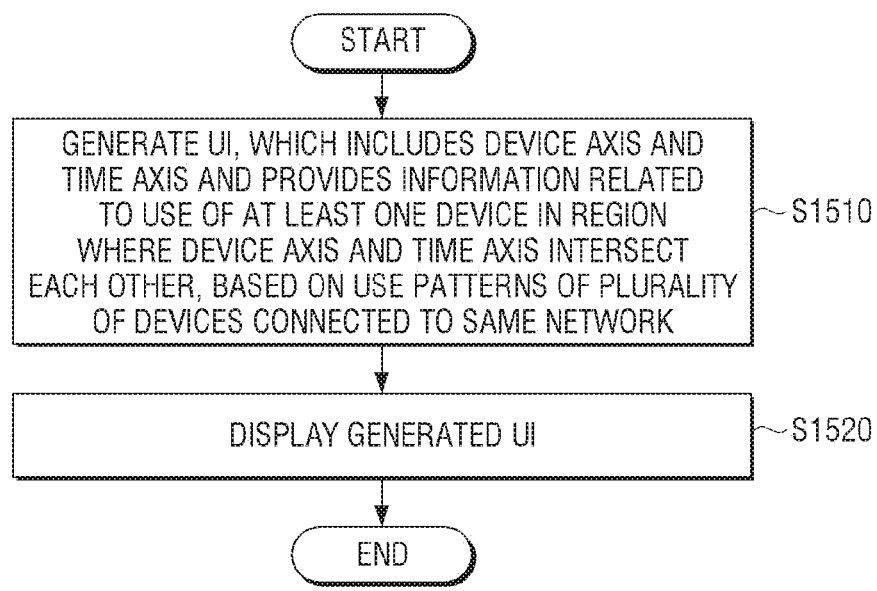
FIG. 15 is a flowchart to illustrate a UI providing method of an electronic device according to an exemplary embodiment of the present disclosure.

FIG. 15 is a flowchart to illustrate a method for providing a UI of an electronic device according to an exemplary embodiment of the present disclosure.

First, the method may generate a UI based on use patterns of a plurality of devices connected to the same network (S1510), wherein the UI includes a device axis and a time axis, and provides information related to use of at least one device in a region where the device axis and the time axis intersect each other. In addition, the method may display the generated UI (S1520).

Herein, the information related to the use of the at least one device may include at least one of information indicating whether an operation state of the at least one device is changed, and detailed information regarding an operation state of the at least one device.

The method may further include: grouping a plurality of devices belonging to a first time section of the time axis on the UI, based on operation states of the plurality of devices, and providing the group; and, in response to the first time section coming, controlling the grouped plurality of devices simultaneously.

The grouping and providing may further include displaying a GUI for visually feeding back information indicating that the grouped plurality of devices are grouped, and, in response to a user interaction of dragging the GUI and dropping the GUI into a second time section being inputted, controlling the grouped plurality of devices to operate in the same operation states in the second time section as the operation states in the first time section.

The device axis may be divided into identification information of the plurality of devices and environment information related to functions of the plurality of devices, and the method may further include providing detailed environment information corresponding to the environment information in a region where the environment information of the device axis and the time axis intersect each other.

In addition, the method may further include: grouping a plurality of devices and the detailed environment information belonging to a third time section of the time axis on the UI, based on the operation states of the plurality of devices, and providing the group; and, in response to the third time section in which an ambient environment is the same as the detailed environment coming, controlling the grouped plurality of devices to operate in the same operation states as the operation states in the third time section.

Herein, the environment information may include at least one of weather, indoor temperature, outdoor temperature, humidity, and illuminance.

The method may further include, in response to a pinch-in interaction being inputted on any one of the regions where the device axis and the time axis intersect each other, displaying a guide message according to detailed information on a device corresponding to the device axis and environment information included in the time axis.

In response to a pinch-in interaction being inputted in the device axis direction, the displaying (S1520) may group the plurality of devices according to types of the devices, and categorize the grouped group according to a type and display the group, and, in response to a pinch-out interaction being inputted in the device axis direction, the displaying may display detailed information of the plurality of devices.

In addition, the displaying (S1520) may include: in response to a pinch-in or pinch-out interaction being inputted in the time axis direction, changing a time unit of the time axis, and changing the information related to the use of the at least one device displayed to information corresponding to the changed time unit.

According to various embodiments of the present disclosure as described above, a UI regarding use patterns of a plurality of devices connected to the same network may be provided, and the plurality of devices may be controlled through the UI, such that user's convenience can be enhanced.

In the above-described example, the use patterns of the plurality of devices are used as they are, and a repeated use pattern is used. However, this should not be considered as limiting. For example, the electronic device may use clustering, classification, frequent pattern mining, etc. in order to extract a meaningful use pattern from the use patterns of the plurality of devices. The electronic device may allow similar use patterns of the use patterns of the plurality of devices to cluster, and, in response to a new use pattern being inputted, the electronic device may classify the new use pattern based on the clustering use patterns, and may mine a frequently used pattern from the use patterns of the plurality of devices. The electronic device may control the plurality of devices by using the extracted meaningful use pattern.

In the above-described example, the electronic device operates based on a use pattern. However, a specific device may malfunction. For example, in response to the main room lamp not being turned on although it should be turned on at 7 a.m., the electronic device may transmit a control command to turn on the main room lamp. In response to the main room lamp not being turned on even after the control command is transmitted a predetermined number of times, the electronic device may display an error message. In addition, the electronic device may inform the user that malfunction occurs in a predetermined method. For example, the user may set the electronic device to transmit a message to a user's smart phone in response to malfunction occurring.

The UI providing method of the electronic device according to various exemplary embodiments of the present disclosure described above may be implemented as a program code executable in a computer, and may be stored in various non-transitory computer readable media, and may be provided to each server or devices to be executed by a processor.

For example, there is provided a non-transitory computer readable medium which stores a program sequentially performing the steps of: generating a UI based on use patterns of a plurality of devices connected to a same network, wherein the UI includes a device axis and a time axis, and provides information related to use of at least one device in a region where the device axis and the time axis intersect each other; and displaying the generated UI.

The non-transitory computer readable medium refers to a medium that stores data semi-permanently rather than storing data for a very short time, such as a register, a cache, a memory or etc., and is readable by an apparatus. Specifically, the above-described various applications or programs may be stored in the non-transitory computer readable medium such as a compact disc (CD), a digital versatile disk (DVD), a hard disk, a Blu-ray disk, a universal serial bus (USB), a memory card, a ROM or etc., and may be provided.

While preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

What is claimed is:

1. An electronic device comprising:
   a display; and
   a processor configured to:
      display, through the display, a UI based on use patterns of a plurality of devices connected to a same network, wherein the UI comprises a device axis and a time axis, and provides information related to use of at least one device in a region where the device axis and the time axis intersect each other,
      based on a touch interaction being input on a region of the UI where a use pattern is not set, display, through the display, a menu for setting a new use pattern for the at least one device and time corresponding to the touched region, the menu including one or more selectable functions related to the at least one device and the time corresponding to the touched region, and
      based on a function being selected from the one or more selectable functions, display, in the touched region, through the display, a graphical element corresponding to the new use pattern, indicating that a use pattern corresponding to the selected function is set.

2. The electronic device of claim 1, wherein the information related to the use of the at least one device comprises at least one of information indicating whether an operation state of the at least one device is changed, and detailed information regarding an operation state of the at least one device.

3. The electronic device of claim 1, wherein the processor is configured to group a plurality of devices belonging to a first time section of the time axis on the UI, based on operation states of the plurality of devices, and to provide the group, and, in response to the first time section coming, the processor is configured to control the grouped plurality of devices simultaneously.

4. The electronic device of claim 3, wherein the processor is configured to display a GUI for visually feeding back information indicating that the grouped plurality of devices are grouped, and
   wherein, in response to a user interaction of dragging the GUI and dropping the GUI into a second time section being inputted, the processor is configured to control the grouped plurality of devices to operate in the same operation states in the second time section as the operation states in the first time section.

5. The electronic device of claim 1, wherein the device axis is divided into identification information of the plurality of devices and environment information related to functions of the plurality of devices, and
   wherein the processor is configured to provide detailed environment information corresponding to the environment information in a region where the environment information of the device axis and the time axis intersect each other.

6. The electronic device of claim 5, wherein the processor is configured to group a plurality of devices and the detailed environment information belonging to a third time section of the time axis on the UI, based on the operation states of the plurality of devices, and to provide the group, and, in response to the third time section in which an ambient environment is the same as an approaching environment, the processor is configured to control the grouped plurality of devices to operate in the same operation states as the operation states in the third time section.

7. The electronic device of claim 5, wherein the environment information comprises at least one of weather, indoor temperature, outdoor temperature, humidity, and illuminance.

8. The electronic device of claim 5, wherein, in response to a pinch-in interaction being inputted on any one of the regions where the device axis and the time axis intersect each other, the processor is configured to display a guide message according to detailed information on a device corresponding to the device axis and environment information included in the time axis.

9. The electronic device of claim 1, wherein, in response to a pinch-in interaction being inputted in the device axis direction, the processor is configured to group the plurality of devices according to types of the devices, and to categorize the grouped group according to a type and to display the group, and
   wherein, in response to a pinch-out interaction being inputted in the device axis direction, the processor is configured to display detailed information of the plurality of devices.

10. The electronic device of claim 1, wherein, in response to a pinch-in or pinch-out interaction being inputted in the time axis direction, the processor is configured to change a time unit of the time axis, and to change the information related to the use of the at least one device displayed to information corresponding to the changed time unit.

11. A method for providing a UI of an electronic device, the method comprising:
   generating a UI based on use patterns of a plurality of devices connected to a same network, wherein the UI comprises a device axis and a time axis, and provides information related to use of at least one device in a region where the device axis and the time axis intersect each other;
   displaying the generated UI;
   based on a touch interaction being input on a region of the UI where a use pattern is not set, displaying a menu for setting a new use pattern for the at least one device and time corresponding to the touched region, the menu including one or more selectable functions related to the at least one device and the time corresponding to the touched region; and based on a function being selected from the one or more selectable functions, displaying, in the touched region, a graphical element corresponding to the new use pattern, indicating that a use pattern corresponding to the selected function is set.

12. The method of claim 11, wherein the information related to the use of the at least one device comprises at least one of information indicating whether an operation state of the at least one device is changed, and detailed information regarding an operation state of the at least one device.

13. The method of claim 11, further comprising:
grouping a plurality of devices belonging to a first time section of the time axis on the UI, based on operation states of the plurality of devices, and providing the group; and
in response to the first time section coming, controlling the grouped plurality of devices simultaneously.

14. The method of claim 13, wherein the grouping and providing further comprises displaying a GUI for visually feeding back information indicating that the grouped plurality of devices are grouped, and, in response to a user interaction of dragging the GUI and dropping the GUI into a second time section being inputted, controlling the grouped plurality of devices to operate in the same operation states in the second time section as the operation states in the first time section.

15. The method of claim 11, wherein the device axis is divided into identification information of the plurality of devices and environment information related to functions of the plurality of devices, and
wherein the method further comprises providing detailed environment information corresponding to the environment information in a region where the environment information of the device axis and the time axis intersect each other.

16. A method for providing a User Interface (UI), the method comprising:
storing use patterns of a plurality of devices connected to a network;
generating a plurality of UIs based on respective use patterns of the plurality of devices;
displaying, on a display, a UI, wherein the UI includes information related to devices of the plurality of devices along a device axis and information related to use of the devices along a time axis;
receiving a user input that includes at least one of a pinch-in interaction and a pinch-out interaction;
in response to receiving the pinch-in interaction, grouping the plurality of devices according to device type and displaying the groups; and
in response to receiving the pinch-out interaction, displaying detailed information of the plurality of devices.

\* \* \* \* \*